(12) United States Patent
Chepak, Jr. et al.

(10) Patent No.: US 12,298,962 B2
(45) Date of Patent: *May 13, 2025

(54) SYSTEMS AND METHODS FOR DATA VALIDATION AND ASSURANCE

(71) Applicant: Blockchain Integrated Partners, LLC, Sarasota, FL (US)

(72) Inventors: Robert M. Chepak, Jr., Sarasota, FL (US); William Brian Evans, Winston-Salem, NC (US)

(73) Assignee: Blockchain Integrated Partners, LLC, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/412,444

(22) Filed: Jan. 12, 2024

(65) Prior Publication Data

US 2024/0362202 A1   Oct. 31, 2024

Related U.S. Application Data

(63) Continuation of application No. 17/343,287, filed on Jun. 9, 2021, now Pat. No. 11,874,819, which is a continuation of application No. 16/022,514, filed on Jun. 28, 2018, now Pat. No. 11,061,886.

(51) Int. Cl.
*G06F 16/16* (2019.01)
*G06F 16/23* (2019.01)

(52) U.S. Cl.
CPC ........ *G06F 16/2365* (2019.01); *G06F 16/168* (2019.01)

(58) Field of Classification Search
None
See application file for complete search history.

(56) References Cited

U.S. PATENT DOCUMENTS

| 8,966,621 B1 | 2/2015 | Johansson et al. |
| 11,874,819 B2 | 1/2024 | Chepak, Jr. et al. |
| 2003/0037094 A1* | 2/2003 | Douceur ............. G06F 16/1748 709/201 |

(Continued)

FOREIGN PATENT DOCUMENTS

WO    WO 2017/136879 A1    8/2017

OTHER PUBLICATIONS

International Search Report and Written Opinion dated Oct. 28, 2019, in connection with International Application No. PCT/US2019/039722.

(Continued)

*Primary Examiner* — Son T Hoang
(74) *Attorney, Agent, or Firm* — Wolf, Greenfield & Sacks, P.C.

(57) ABSTRACT

Various embodiments can implement a multi-system or node architecture that can be deployed on-demand and augment existing systems with pre-configured nodes that can be installed within existing architecture. The multi-node architecture is flexible for integration into many systems and can also stand alone to provide data validation and assurance. Various embodiments of the multi-node architecture enable private and public distributed ledgers (e.g., blockchains) that enhance security, enhance confidentiality, and eliminate the need to trust the provider/hosts of the data validation information and/or the hosts of the confidential information.

20 Claims, 17 Drawing Sheets

(56) References Cited

U.S. PATENT DOCUMENTS

| | | |
|---|---|---|
| 2007/0061721 A1 | 3/2007 | Bustelo et al. |
| 2009/0006842 A1 | 1/2009 | Ross et al. |
| 2009/0327874 A1 | 12/2009 | Jacquin et al. |
| 2010/0042842 A1* | 2/2010 | Huang ............... G06F 16/2365 |
| 2013/0318589 A1 | 11/2013 | Ford et al. |
| 2017/0048216 A1 | 2/2017 | Chow et al. |
| 2017/0091467 A1 | 3/2017 | Pogorelik et al. |
| 2017/0091756 A1* | 3/2017 | Stern .................... G06F 16/951 |
| 2017/0193619 A1 | 7/2017 | Rollins et al. |
| 2017/0222814 A1 | 8/2017 | Oberhauser et al. |
| 2017/0230353 A1 | 8/2017 | Kurian et al. |
| 2017/0331896 A1 | 11/2017 | Holloway et al. |
| 2018/0129955 A1 | 5/2018 | Saxena et al. |
| 2018/0173719 A1 | 6/2018 | Bastide et al. |
| 2018/0198624 A1* | 7/2018 | Bisti .................... G06F 16/168 |
| 2018/0285839 A1 | 10/2018 | Yang et al. |
| 2018/0300382 A1 | 10/2018 | Madisetti et al. |
| 2019/0123889 A1* | 4/2019 | Schmidt-Karaca ..... G06F 16/93 |
| 2019/0140822 A1* | 5/2019 | Xie ..................... G06F 16/2458 |
| 2019/0236559 A1 | 8/2019 | Padmanabhan |
| 2019/0356493 A1* | 11/2019 | Fisher .................... G06F 16/93 |
| 2019/0361869 A1 | 11/2019 | Krabbenhöft et al. |
| 2019/0377806 A1* | 12/2019 | Padmanabhan ..... G06F 16/1834 |
| 2019/0386833 A1 | 12/2019 | Alger et al. |
| 2020/0004855 A1 | 1/2020 | Chepak, Jr. et al. |
| 2020/0007343 A1 | 1/2020 | Evans |
| 2020/0007344 A1 | 1/2020 | Chepak, Jr. et al. |
| 2020/0143367 A1 | 5/2020 | LeBeau et al. |

OTHER PUBLICATIONS

Invitation to Pay Additional Fees dated Aug. 15, 2019, in connection to International Application No. PCT/US2019/039722.
International Preliminary Report on Patentability dated Jan. 7, 2021, in connection with International Application No. PCT/US2019/039722.

* cited by examiner

FIG. 6

Report Options

Display as Table

[Generate Report]

User Criteria
- Association
- Group
- User
- Date

Sort-Specific Filters
- Activity Type

[Export to the Selected Format ▽] [Export]

Project Baseball: Top 20 Documents

| Rank | Accessed | Index Position | File Name | Folder Path | logged digest |
|---|---|---|---|---|---|
| 1 | 3 | 2.1 | DS Venue__Roundtable Sell Sheet.pdf | Project Baseball/Company 2 | a60938905c242c84c52c7778887ecfe7fc8 |
| 2 | 3 | 1.1 | Port of Tacoma RFP.pdf | Project Baseball RFP Documents | 68fd5167a4c65247bd311d5c394c25f323 |
| 3 | 2 | 2.2 | eBrevia All Products.pdf | Project Baseball/Upload | 1120b3ff2b408ff1a6bc1d9611b46582ae6 |
| 4 | 2 | 2.3 | Venue Security Sell Sheet HR (1).pdf | Project Baseball/Upload | 9a7130e27976355926f669691dbd4aaa7 |
| 5 | 2 | 2.5 | Good Afternoon Sandy.docx | Project Baseball/Company 2 | 28764c3960901f58774224fab33ecf8c3c216 |
| 6 | 2 | 11.1 | Venue Contract Analytics 2015 Sell Sheet.pdf | Project Baseball 11-Contracts - Agreements | c4f18b997bf716e2f57a4b81ecffc5894e0 |
| 7 | 2 | 1.2 | Bellingham towing.pdf | Project Baseball/ RFP documents | 1c8215246c764d022af81f3ee4d05b6c9d |
| 8 | 2 | 1.9 | Port of Tacoma RFP.pdf | Project Baseball/RFP documents | b4953c864d8d74b4884cb6f125268098c19 |
| 9 | 1 | 1.6 | Tacoma Trailer Repair and Services.pdf | Project Baseball/RFP documents | <4281db1368468211426966ad547965ca |
| 10 | 1 | 1.1.1 | Port of Tacoma RFP.pdf | Project Baseball/Tacoma Docs | 79b60809f9b573b4bdaa365cb4d93dd0e36 |

FIG. 12

SYSTEMS AND METHODS FOR DATA VALIDATION AND ASSURANCE

RELATED APPLICATIONS

This application is a continuation of and claims priority under 35 U.S.C. § 120 to U.S. patent application Ser. No. 17/343,287, filed on Jun. 9, 2021, and entitled "SYSTEMS AND METHODS FOR DATA VALIDATION AND ASSURANCE" which is a continuation of and claims priority under 35 U.S.C. § 120 to U.S. patent application Ser. No. 16/022,514, filed on Jun. 28, 2018 and entitled "SYSTEMS AND METHODS FOR DATA VALIDATION AND ASSURANCE," each of which is incorporated herein by reference in their entirety.

BACKGROUND

Many developments have taken place to incorporate cloud based access and encryption technology to facilitate management and execution of large-scale document review and/or document based service. Such projects can be commonplace in merger and acquisition activity. Traditionally, due diligence in such settings relies on paper based "data rooms." These data rooms are filled with documentation of every aspect of corporate existence, operation, etc. Recently developments have updated these physical data rooms into the virtual space providing virtual data rooms ("VDR") that connect to a document database and display system. Unfortunately, these conventional systems and even these virtual data rooms ("VDRs") only provide basic levels of information assurance (i.e., information integrity and validity). Conventional systems, although more accessible, are still subject to changes in data and/or omissions regarding access and/or availability of all relevant documents.

SUMMARY

It is realized that there is a need for improved integration of information assurance. And for example, there is a need for provable information integrity and validity, that can be incorporated, into virtual data room architectures. According to some aspects and embodiments, there is need for an automatic virtual notary that can provide evidence of data presence, evidence of any changes, while maintaining data security, data confidentiality, and data privacy. There is a further need for extending such information assurance into and beyond virtual data rooms and into various systems and operations that require proof of data validity and/or data integrity, and proof of any operations taken with respect to those documents or data.

Accordingly, systems and methods for data validation and assurance are provided. Various embodiments can implement a multi-system or multi-node architecture that can be deployed on-demand and augment existing systems with pre-configured nodes that can be installed within existing architecture. According to various embodiments, the multi-node architecture is flexible for integration into many systems and can also stand alone to provide data validation and assurance. Various embodiments of the multi-node architecture enable private and public distributed ledgers (e.g., blockchains) that enhance security, enhance confidentiality, and eliminate the need to trust the provider/hosts of the data validation information and/or the hosts of the confidential information.

According to one aspect, the system provides enhancements over conventional approaches, automatically generating provable assurance information which can, in some examples, be shared publicly. For example, the system implements hybrid private/public distributed ledgers for generating verification information and provides public access to portions of the assurance/verification information (e.g., public portions of the distributed ledger).

According to some embodiments, the architecture is configured for flexible privacy boundaries that establish who can access the public or private ledgers, and within the privacy boundary the system architecture is configurable for who can access and/or have control of the underlying information itself. According to one embodiment, inside the privacy boundary, entities or users with confidential information are given complete control over the generation of verification information. In one example, the verification information is generated by the system using a one way function (e.g., a hash or a secure hash function) without requiring external access to confidential information (or the confidential information ever leaving its host system). The output of the one way function is then built into a distributed ledger (e.g., as a block in a blockchain). And external entities (e.g., outside the privacy boundary) can review a public distributed ledger to verify certain information (e.g., valuation documents) existed in a specific form (e.g., akin to a document snapshot) at a specific time without need to access the underlying confidential information. In some aspects, reviewers do not need to trust that verification information generated by the host/manager of the confidential information is valid, and a reviewer can regenerate the verification information to determine a match, and the existing verification information can also be verified against, for example against a public chain.

Unlike conventional verification systems, various embodiments enable administrative users or system managers to employ the functionality provided by the system to set and dynamically adjust the privacy boundaries, limiting or granting access to underlying confidential information. According to some embodiments, the privacy boundary is a logical barrier implemented within the system that prevents parties from accessing specific information that is to be maintained in confidence, while at the same time specifying access to assurance information (e.g., via a verifiable distributed ledger). In further embodiments, the system provides hybrid distributed ledgers or combinations of both public and private ledgers for verification.

In further aspects, the verification system provides user interfaces and application programming interfaces to enable seamless integration into existing architecture. According to one embodiment, the user interface is based on a file hierarchy tailorable to an existing architecture or system. According to one example, the user interface enables visual confirmation of verification information for data within a repository, file system, computer system, client site, etc. For example, the user interface provides overlay displays within existing user interfaces of client systems and provides for any one or more of the following examples: that verification information (e.g., a hash) exists for given document; the verification information is valid; no verification information exist; or the verification information is invalid. The system can further augment existing user interfaces of an underlying system to enable point and click generation of validation information in the native UI, or in some alternatives provide new screens for generating verification information.

According to further embodiments, the user interface and/or the verification system is also configured to log operations taken with respect to any information (for example, within the privacy boundary). For example, the system and/or UI is configured to log any action taken on the confidential information (e.g., view, access, modify, move, update, delete, etc.). For example, in large commercial deals the fact that a reviewer accessed given documents can be essential information. The user access is logged, and the access information can first be input to the one way function by the system, and the access information (or anonymized access information) is built into the distributed ledger. In one example, such logged information can remain within the privacy boundary, but also the system can be dynamically configured to set the privacy boundary such that anonymized log information can be built into a public ledger. In various embodiments, system settings accessible by privileged user enable initial definition of the privacy boundary, and also enable tailoring of the privacy boundary.

In yet further aspects, the interplay of the various elements of the verification system provide improvement over conventional systems for information assurance and verification. For example, the user interface can integrate into existing systems and augment native operations with verification functionality, or provide new screens for visually validating confidential documents/files, and for generating verification information for any confidential information. In some examples, the UI highlights data, documents, and/or files, in the UI that lack verification information or fail to match existing verification information. Additionally, the system provides integration of logical layers for verifiable logging of operations executed within the system. In one example, the a logical layer can include a data management layer that handle native requests for data access Thus, any operations performed by users on the system (e.g., administrators, or any reviewer operating within the system, etc.) can be logged and built into a distributed ledger (either directly for private ledgers or anonymously (e.g., identifying or confidential information hashed for public ledgers).

According to one aspect a system for data verification and assurance is provided. The system comprises at least one processor operatively connected to a memory, the at least one processor configured to execute a plurality of system components, a hash component configured to accept data from a data repository and execute a one way function on the input data, a ledger component configured to generate commitment blocks of verification data including at least an output of the one way function, and append new commitment blocks to a distributed ledger chain; wherein the ledger component is further configured to: create at least a first private verification chain of one or more commitment blocks generated at least from one or more target documents or files stored in the data repository, and generate, automatically, at least a first public verification chain of one or more commitment blocks for verifying a state of the first private chain.

According to one embodiment, the system further comprises an event monitor component, executed by the at least one processor, configured to log user or system operations. According to one embodiment, the system the event monitor component is configured to log data access or data update operations on the file repository. According to one embodiment, the system the event monitor component is configured to log contextual information associated with the access or the data update operations (e.g., user name, timestamp, requesting system identifier, date and time, etc.). According to one embodiment, the system the event monitor component is configured to communicate the logged operations to the ledger component. According to one embodiment, the system the ledger component is further configured to incorporate logged operations into the first private verification chain and automatically update the first public verification chain with one or more new commitment blocks for verifying additions to the private chain. According to one embodiment, the system the ledger component is further configured to generate a second private verification chain for verifying logged operations and a corresponding second public verification chain for validating the second private verification chain.

According to one embodiment, the ledger component is further configured to: manage data within the file repository based on respective projects; and generate respective first private and first public verification chains for the respective projects. According to one embodiment, the ledger component is further configured to regenerate verification data responsive to verification events (e.g., periodic, aperiodic, user access, display in UI, data update, report generation, etc.) and determine a validation state based on matching the regenerated verification data to private or public chain information. According to one embodiment, the system further comprises an object manager component, executed by the at least one processor, configured to control user access to the data repository.

According to one aspect a computer implemented method for data verification and assurance is provided. The method comprises accepting, by at least one processor, data from a data repository and executing a one way function on the input data, generating, by the at least one processer, commitment blocks of verification data including at least an output of the one way function, and appending new commitment blocks to a distributed ledger chain; creating, by the at least one processor, at least a first private verification chain of one or more commitment blocks generated at least from one or more target documents or files stored in the data repository, and automatically, generating, by the at least one processor, at least a first public verification chain of one or more commitment blocks for verifying a state of the first private chain.

According to one embodiment, the method further comprises logging user or system operations. According to one embodiment, the method further comprises logging data access or data update operations on the file repository. According to one embodiment, the method further comprises logging contextual information associated with the access or the data update operations (e.g., user name, timestamp, requesting system identifier, date and time, etc.). According to one embodiment, the method further comprises communicating the logged operations to a ledger component. According to one embodiment, the method further comprises incorporating logged operations into the first private verification chain and automatically updating the first public verification chain with one or more new commitment blocks for verifying additions to the private chain. According to one embodiment, the method further comprises generating a second private verification chain for verifying logged operations and a corresponding second public verification chain for validating the second private verification chain.

According to one embodiment, the method further comprises managing data within the file repository based on respective projects, and generating respective first private and first public verification chains for the respective projects. According to one embodiment, the method further comprises regenerating verification data responsive to verification events (e.g., periodic, aperiodic, user access, display in UI, data update, report generation, etc.), and determining a validation state based on matching the regenerated verification data to private or public chain information. According to one embodiment, the method further comprises controlling user access to the data repository.

According to one aspect a computer readable medium containing instructions that when executed cause at least one processor to perform a method for data verification and assurance is provided. The method comprises accepting data from a data repository and executing a one way function on the input data, generating commitment blocks of verification data including at least an output of the one way function, and appending new commitment blocks to a distributed ledger chain, creating at least a first private verification chain of one or more commitment blocks generated at least from one or more target documents or files stored in the data repository, and automatically generating at least a first public verification chain of one or more commitment blocks for verifying a state of the first private chain.

According to one aspect a system for securing data integrity is provided. The system comprises at least one processor operatively connected to a memory, the at least one processor configured to execute a plurality of system components, a document subsystem, executed by the at least one processor, configured to enable at least one or more of electronic document review, document auditing, or search operations within a file repository, a verification engine, executed by the at least one processor, configured to accept as input data stored in the file repository, generate an output value based on executing a one way function on the input data, generate at least a first verification chain incorporating the output value and cryptographic signature, wherein the first private verification chain is a limited access distributed ledger for permissioned users (for example, of the document subsystem), generate at least a publicly available second verification chain based on output values from the one way function executed on the first verification chain as input, and at least a first application programming interface (API), executed by the at least one processor, configured to manage access requests to the file repository by the document subsystem and the verification engine.

According to one embodiment, the document subsystem enables a virtual data room for securely reviewing or searching data within the file repository. According to one embodiment, at least the first API is configured to manage user requests received from a user interface to manually generate verification information on data in the file repository or data room. According to one embodiment, the ledger component is configured to automatically generate an update to the second verification chain responsive to executing the user request to generate verification information. According to one embodiment, the system further comprises a privacy component, executed by the at least one processor, configured to manage access to the file repository or subsets of the file repository, the virtual data room, and access permission to the private verification chain. According to one embodiment, the system further comprises a privacy component, executed by the at least one processor, configured to manage access to the file repository or subsets of the file repository, and access permission to the private verification chain.

According to one embodiment, at least the first API communicates access request information to the privacy component to enable or deny access, including access to the private verification chain. According to one embodiment, the system further comprises an event monitor component, executed by the at least one processor, configured to log user or system operations. According to one embodiment, the ledger component is further configured to incorporate logged operations into the first private verification chain and automatically update the first public verification chain with one or more new commitment blocks for verifying additions to the private chain.

According to one aspect a computer implemented method for securing data integrity is provided. The method comprises hosting a document subsystem, wherein hosting the document subsystem includes executing at least one or more of electronic document review, document auditing, or search operations within a file repository, accepting, by at least one processor, as input data stored in the file repository into a one way function, generating, by the at least one processor, an output value based on executing the one way function on the input data, generating, by the at least one processor, at least a first verification chain incorporating the output value and cryptographic signature, wherein the first private verification chain is a limited access distributed ledger for permissioned users, generating, by the at least one processor, at least a publicly available second verification chain based on output values from the one way function executed on the first verification chain as input, and executing, by the at least one processor, at least a first application programming interface (API), wherein executing the API includes managing access requests to the file repository by the document subsystem and the verification engine via the API.

According to one embodiment, the method further comprises hosting a virtual data room for securely reviewing or searching data within the file repository. According to one embodiment, the method further comprises an act of managing by the API user requests received from a user interface to manually generate verification information on data in the file repository or data room. According to one embodiment, the method further comprises an act of automatically generating an update to the second verification chain responsive to executing the user request to generate verification information. According to one embodiment, the method further comprises managing access to the file repository or subsets of the file repository, the virtual data room, and access permission to the private verification chain. According to one embodiment, the method further comprises managing access to the file repository or subsets of the file repository, and access permission to the private verification chain. According to one embodiment, the method further comprises communicating access request information to via the at least the first API to enable or deny access, including enabling or denying access to the private verification chain. According to one embodiment, the method further comprises an act of logging user or system operations by an event monitor. According to one embodiment, the method further comprises incorporating logged operations into the first private verification chain and automatically updating the first public verification chain with one or more new commitment blocks for verifying additions to the private chain.

According to one aspect a computer readable medium containing instructions that when executed cause at least one processor to perform a method for securing data integrity is provided. The method comprises hosting a document subsystem, wherein hosting the document subsystem includes executing at least one or more of electronic document review, document auditing, or search operations within a file repository, accepting as input data stored in the file repository into a one way function, generating an output value based on executing the one way function on the input data, generating at least a first verification chain incorporating the output value and cryptographic signature, wherein the first private verification chain is a limited access distributed ledger for permissioned users, generating at least a publicly available second verification chain based on output values from the one way function executed on the first verification chain as input, and executing at least a first application programming interface (API), wherein executing the API includes managing access requests to the file repository by the document subsystem and the verification engine via the API.

According to one embodiment, the method further comprises hosting a virtual data room for securely reviewing or searching data within the file repository.

According to one aspect a system for data verification and assurance is provided. The system comprises at least one processor operatively connected to a memory, the at least one processor configured to execute a plurality of system components, a user interface component, executed by the at least one processer, configured to display verification elements in a user interface configured to accept user selection, trigger generation of verification information on data within a file repository responsive to selection of a respective verification element in the user interface, display status information for validation of the verification information associated with displayed data from the file repository and a verification engine, executed by the at least one processor, configured to receive a request from the user interface to generate the verification information generate at least a first portion of a first private verification chain incorporating an output generated from a one way function executed on the data specified by the user interface, responsive to the received request, and generate, automatically, at least a portion of a publicly available second verification chain based on output values from the one way function executed on the first verification chain as input.

According to one embodiment, the system further comprises a verification component configured to test a validity of data in the data repository. According to one embodiment, the verification component is configured to regenerate verification information and determine if the regenerated information matches the portion of the first private verification chain. According to one embodiment, the user interface is configured to display a file listing associated with at least a portion of the data in the data repository, and integrate a respective visual indication of a validity status associated with a respective file in the file listing. According to one embodiment, the user interface is configured to integrate the display of the verification elements into an existing user interface for an existing application or service. According to one embodiment, the user interface is configured to integrate a respective visual indication of existing of verification information associated with a respective file in the file listing. According to one embodiment, the user interface is configured to selectively display a respective visual indication of existing verification information or a verification element configured to trigger generation of verification information for displayed data objects without verification information. According to one embodiment, the system further comprises a document subsystem, executed by the at least one processor, configured to enable at least one or more of electronic document review, document auditing, or search operations within a file repository. According to one embodiment, the user interface component is configured to integrate verification elements and verification status displays into existing user interfaces of the document subsystem. According to one embodiment, the user interface component is configured to identify open space in the user interface to integrate the verification elements and verification status displays or to overlay displays of the verification elements and verification status displays.

According to one aspect a computer implemented method for data verification and assurance is provided. The method comprises displaying, by at least one processor, verification elements in a user interface configured to accept user selection, triggering, by the least one processor, generation of verification information on data within a file repository responsive to selection of a respective verification element in the user interface, displaying, by the least one processor, status information for validation of the verification information associated with displayed data from the file repository, and receiving, by the least one processor, a request from the user interface to generate the verification information, generating, by the least one processor, at least a first portion of a first private verification chain incorporating an output generated from a one way function executed on the data specified by the user interface, responsive to the received request, and automatically generating, by the least one processor, at least a portion of a publicly available second verification chain based on output values from the one way function executed on the first verification chain as input.

According to one embodiment, the method further comprises a verification component configured to test a validity of data in the data repository. According to one embodiment, the method further comprises regenerating verification information and determining if the regenerated information matches the portion of the first private verification chain. According to one embodiment, the method further comprises displaying a file listing associated with at least a portion of the data in the data repository, and integrating a respective visual indication of a validity status associated with a respective file in the file listing. According to one embodiment, the method further comprises integrating the display of the verification elements into an existing user interface for an existing application or service. According to one embodiment, the method further comprises integrating a respective visual indication of existing of verification information associated with a respective file in the file listing.

According to one embodiment, the method further comprises selectively displaying a respective visual indication of existing verification information or a verification element configured to trigger generation of verification information for displayed data objects without verification information. According to one embodiment, the method further comprises enabling at least one or more of electronic document review, document auditing, or search operations within a file repository. According to one embodiment, the method further comprises integrating verification elements and verification status displays into existing user interfaces of the document subsystem. According to one embodiment, the method further comprises identifying open space in the user interface and integrating the verification elements and verification status displays or overlaying displays of the verification elements and verification status displays.

According to one aspect a computer readable medium containing instructions that when executed cause at least one processor to perform a method for data verification and assurance is provided. The method comprises displaying verification elements in a user interface configured to accept user selection, triggering generation of verification information on data within a file repository responsive to selection of a respective verification element in the user interface, displaying status information for validation of the verification information associated with displayed data from the file repository, receiving a request from the user interface to generate the verification information, generating at least a first portion of a first private verification chain incorporating an output generated from a one way function executed on the data specified by the user interface, responsive to the received request, and automatically generating at least a portion of a publicly available second verification chain based on output values from the one way function executed on the first verification chain as input.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 6 is an example user interface screen and example logged data, according to some embodiments;

FIG. 12 is an example screen capture according to some embodiments;

DETAILED DESCRIPTION

Figure 1:
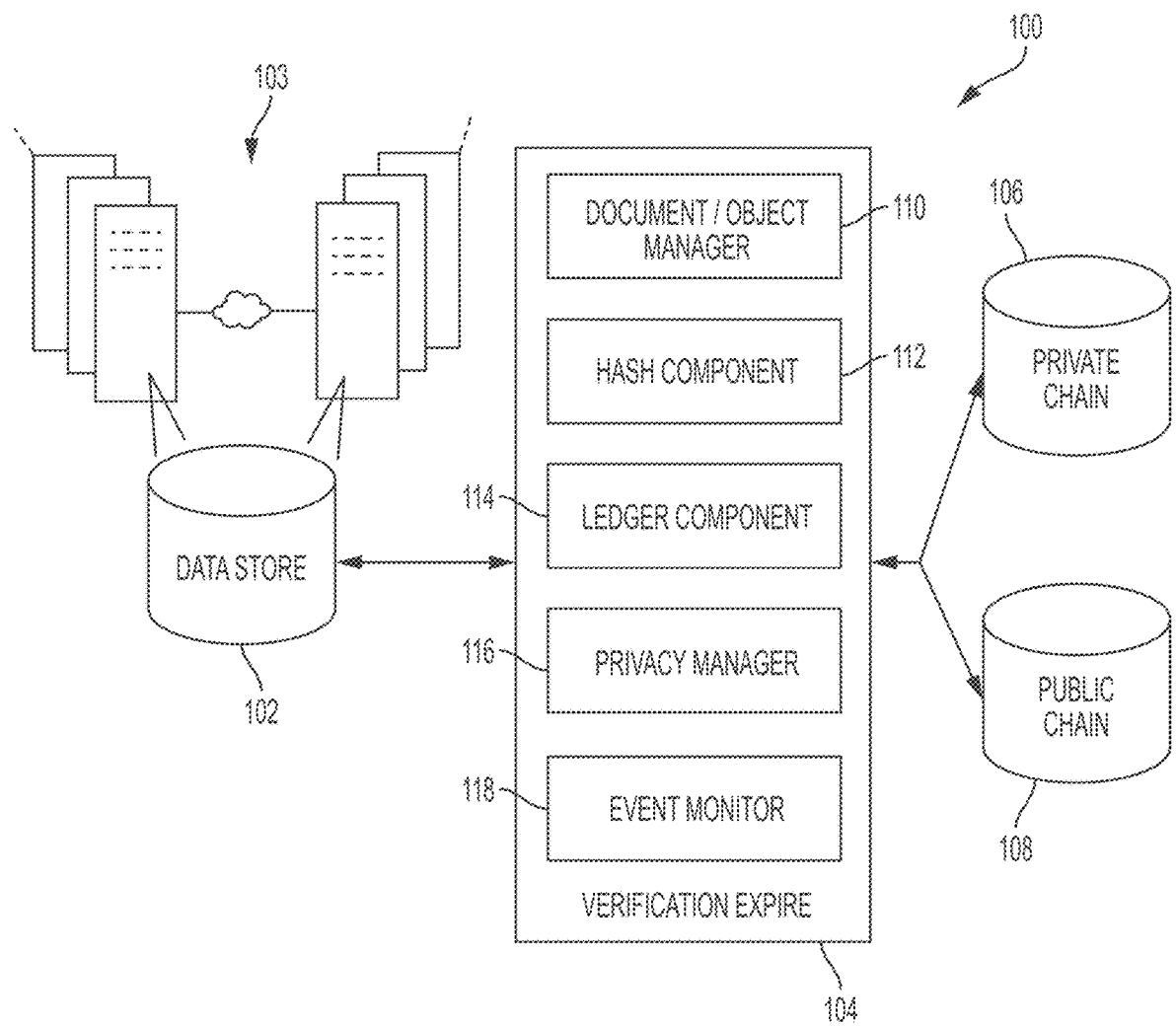
FIG. 1 is a block diagram of an example data verification system configured to manage generation and verification of validation information, according to some embodiments.

Various computers systems and users may need to verify information integrity and/or existence as part of many secure operations. In many settings, the ability to prove data was present and was present is a specific form can be essential to these operations. Accordingly, a data verification system is provided that generates validation or verification information on data contained in a database, data store, data warehouse or other form of electronic storage. The system can provide tailorable privacy settings to enable generation of verification information (e.g., in the form of a distributed blockchain or as part of a distributed block chain) while preserving control of the underlying confidential information to those users/entities in possession or control of the confidential information.

According to various embodiments, the data verification system can be integrated into existing systems and/or architectures, and extend their functionality with data verification operations and user interfaces. In some settings, the data verification system is architected to integrate or augment "data room" systems. Data rooms are used in traditional due diligence processes for large transactions. In particular, the data verification system can be configured to integrate or interact with virtual data room systems and/or services to provide for data verification at a level not available in conventional platforms. In various embodiments, the verification system provides new functionality, for example, with hybrid private and public distributed ledgers for generating verification information.

Various user interfaces or user interface objects can be provided that integrate with existing systems and/or UIs or provide for new user interface screens that reduce user error and enable execution of verification functions.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Example Verification System

FIG. 1 is a block diagram of an example verification system 100. The verification system can be integrated into existing architectures, applications, systems etc. Including, for example, data store 102 and any architecture that supports the data store 102 (e.g., at 103). According to one embodiment, the verification system 100 can mediate requests from existing systems to the data store (e.g., 102) to provide functions for verification on information stored within the data store as well as verification information for actions performed (e.g., read, write, view, modify, etc.) on the data store. The system 100 can include a verification engine 104 that executes the functions described herein with respect to verification system and/or the verification system components.

According to various embodiments, verification system 100 and/or engine 104 accesses data within a data store, processes the data to generate verification information. In one example, the verification information can take the form of a private distributed ledger (e.g., 106). The private ledger can include a blockchain for verification of the presence of data, data integrity (i.e., not modified or modified in a known manner), among other options. A blockchain is a continuously growing list of records, each referred to as "blocks," which are linked and secured using cryptography. Often blocks are generated to contain a cryptographic hash of the previous block, a timestamp and operation/transaction data. By design, the blockchain is resistant to modification of the data and can be used as record of operation, for example, with data in the datastore (e.g., 102). According to various embodiments, data or data access activity can be incorporated into the blockchain or a activity log blockchain, allowing subsequent parties to review and verify access and/or other operation taken by users with respect to the data in the datastore.

In some embodiments, the verification information can also take the form of a public ledger (e.g., a public blockchain). For example, the system can be configured to automatically generate a public ledger, based on existing verification information incorporated into the private ledger. In some embodiments, the system 100 and/or engine 104 executes a one way function on the private ledger to generate an output value reflecting the state of the private ledger. The output is incorporated into a block of a publicly available blockchain. In some architectures, the system executed an ETHEREUM client to provide for blockchain generation, and can also incorporate verification information into a public ETHEREUM chain.

In VDR settings, the verification system is configured to augment the document/data collection, compilation, and review functions provides by the VDR systems. In various embodiments, the system builds private verification information on files that are uploaded into a project housed on the VDR system. Further embodiments generate public verification information (e.g., using the private verification information as input to a one way function) to eliminate any need to trust the private verification information. For example, the state (e.g., presence, validity, integrity, etc.) of one more documents in the project can be validated using the private verification information. In one example, a reviewer can regenerate the private verification information (e.g., with access to the confidential information) and determine a match. The system also enables verification of the private verification information based on regeneration of the public information. If the regenerated public verification information matches, the reviewer can determine not changes have occurred.

According to some embodiments, the system 100 and/or engine 104 can be configured to generate an anonymizing value for information to be verified. In one example, the anonymizing value is a one way hash value. In another example, the anonymizing value is an encryption value based on a document or file to be verified. The anonymizing value can be incorporated into the private or public distributed ledger (e.g., the private or public blockchains). In one example, the anonymizing value is incorporated into a block on a block chain ledger. The anonymizing functionality provides an additional layer or security and/or confidentiality, and at the same time allows the system to provide verification information that can be tested at a later date. According to various aspects, as the verification information itself is established by incorporation into a block chain-any entity seeking to validate the information can be assured that the verification information itself has not been compromised. In still other examples, any private ledgers or chains can also be input to an anonymizing function and incorporated into, for example, a public ledger, eliminating any concerns for internal tampering.

According to some embodiments, confidentiality of the underlying data and/or documents can be paramount. Thus, the verification system can be configured to limit access to the underlying data or database to the entity in possession or control of the data. Specifically, even in cloud based architectures or distributed verification systems, the entity holding the data can be provided with local functionality (e.g., within a privacy boundary) to generate verification information. Thus, various implementations of the system ensure that only verification information that cannot be used to regenerate the underlying information (e.g., the confidential information) is allowed outside the privacy boundary and the confidential information remains subject to the control of the entity.

According to various embodiments, the system 100 and/or the engine 104 can instantiate a variety of components configured to perform functions of the verification system. According to one embodiment, the system and/or engine can include a document/object manager component 110 which is configured to manage data access stored in respective repositories (e.g., database 102). The document manager 110 can be configured to generate access displays and/or verification displays in existing systems. For example, when the verification system 100 is integrated into an existing platform, the document manager can analyze information in the native data store and provide hierarchical displays of the data. The displays are configured to trigger generation of verification information (e.g., based on triggering a hash component or a ledger component discussed in greater below). In one example, the document manager provides user interfaces organized similar to a file hierarchy and provides selectable display objects in conjunction with file names or data objects that trigger generation of verification information.

In further embodiments, the document manager component 110 is configured to monitor access to the files, data, data objects, stored in the data store or other database via the UI and generate verification information regarding the access (e.g., user identifier, time of access, validation information for data at time of access, among other options). In further embodiments, the system and/or engine can include an event monitor component 118 configured to monitor data access (e.g., through the UI), track any changes to file structure (e.g., moved files/data, added files/data), any changes to underlying data, and associated those changes or any operations on the stored data with users, times, and any other log information. With the document manager component and/or the event monitor component the complete provenance for data in the datastore can be captured and committed to the verification data. In one example, the data's provenance (e.g., origination information (e.g., date created, location, creating user, etc.), any modification information, any access information, etc.) is built into a verification ledger for later validation. The verification information can first be anonymized via hashing or encryption, and the hashed information incorporated into a private or public ledger.

In some embodiments, the system 100 and/or engine 104 includes a hash component 112 configured to accept data as input and apply a hash function or encryption operation to the input data. The output can be incorporated in a blockchain for subsequent verification (e.g., via execution of a ledger component 114). In one example, the hash component executes a secure hash function (e.g., SHA256) on input data producing a hash value or digital signature that can be incorporated into either a private or public ledger.

In further embodiments, the system can include a ledger component 114 configured to build blocks for a blockchain including the verification data. In typical execution, users select data files or lists of files shown, for example, though the document or object manager 110, to trigger creation of validation information. In one example, the selected documents or data objects can be passed as input to the hash component 112 and the output used by the ledger component 114 to build blocks of a ledger (e.g., a blockchain) that establishes existence and integrity for respective documents or data objects. An event manager 118 can execute in conjunction with building such verification information, capturing information on the user, time, etc., and that verification information used to generated further validation information incorporated into the same blockchain or into one or more separate event tracking blockchains.

According to some embodiments, the system 100 and/or engine 104 can include a privacy manager component 116. The privacy component 116 can be configured to control operation of the hash and ledger components. In one example, private blockchains (e.g., accessible like underlying confidential information in a datastore) can be generated directly on confidential information. The privacy component 116 can be configured to enable system users to designate the parameters of verification information generation on the system. In some example, the parameters can include specification of the type of verification chain (e.g., public, private, or hybrid). In the private setting, the privacy component 116 can be configured to require input of the information to verify first through an anonymizing function (e.g., provided by hash component 112) and then incorporation into a blockchain. In other examples, the privacy component 116 enables a user to permit verification information to be generated directly on the confidential information.

In further embodiments, the privacy component 116 is configured to establish the boundaries of logical privacy zones with the system. In some examples, the verification system is configured to augment native document management applications or systems (including for example virtual data room applications or services). The privacy component 116 is configured to identify components and/or users of the existing system as within the privacy boundary or without the privacy boundary. Depending on where system components exist with respect to the logical boundary, the system allows or denies access to confidential verification information or permits only access to public versions of the verification information. In some examples, the system and/or privacy component is configured to define privacy boundaries for individual files, groups of files, data objects, groups of data objects, or any other type of storage unit within a database or datastore. In further embodiments, elements of an existing architecture (e.g., servers, computers, application, processes, etc.) can be defined as within or without a privacy boundary using the privacy component 116.

According to one embodiment, the system can provide discovery options for identifying applications and/or computer systems that connect to data repositories that host confidential information (e.g., datastore 102). The privacy component can be configured to generate visual representations of a logical architecture of the connecting systems and/or applications. Responsive to selection within the visual representation system elements, application, etc. can be defined as within a privacy boundary or without the privacy boundary. According to various embodiments, the system enables dynamic selection and/or tailoring of the privacy boundaries. In some examples, multiple boundaries may be in place for a given implementation and/or for various portions of a data repository.

Figure 2:
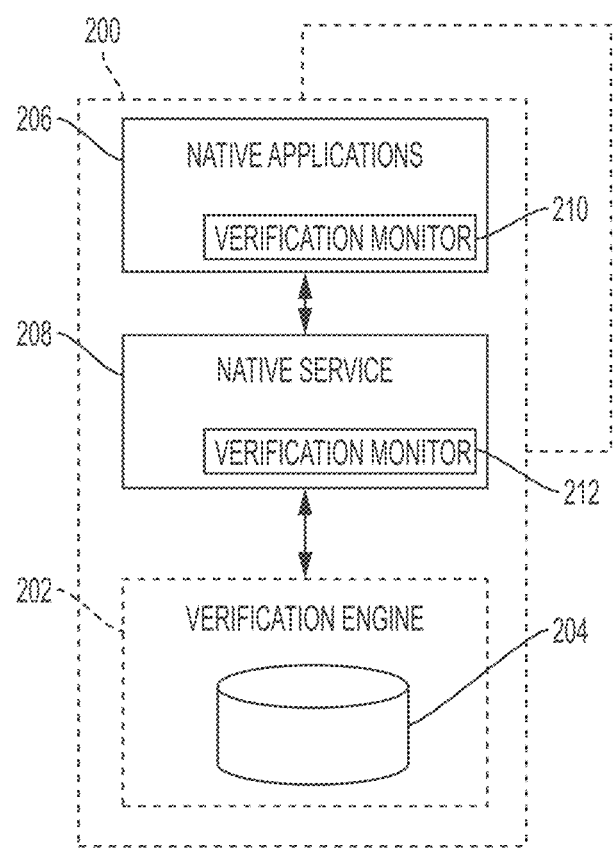
FIG. 2 is a block diagram of an example implementation of a data verification system, according to some embodiments.

FIG. 2 is a block diagram of an example implementation of a verification system 200. In the example, the verification system 200 includes a verification engine 204 that manages data access to a confidential data repository and mediates connections to the data repository 204. In the illustrated example, the verification system has been installed on existing or native applications and/or services (e.g., virtual data room systems), the verification engine is configured to manage access by the native applications and/or services (e.g., 206 and 208 respectively). The existing architecture is augmented to provide data verification functionality. In one embodiment, the verification engine can be installed as an application layer (e.g., verification engine 202) that manages data access. In some examples, the verification engine 202 includes one or more APIs that are called by native application 206 (e.g., data viewers, document viewers, etc.) and/or native services 208.

In other examples, the verification system and/or engine 202 can include monitor processes that are configured to manage access to the verification engine 202 and/or database 202. In some examples, the monitor processes (e.g., 210 and 212) manage communication between native applications and services and any data repository (e.g., 204). The verification system is architected to enhance various native systems, applications, and/or architectures. In some embodiments, the native application and architecture is implemented on cloud based components, and likewise the verification system can be implemented within any security domain of those cloud components. In various embodiments, the monitor processes and/or verification engine 202 can be installed on the same cloud resources or on new cloud resources. According to various embodiments, the system is configured to manage privacy settings for the new resources that enables the entity with confidential information to establish the privacy boundaries for the new cloud components and/or processes. In some examples, the system can be configured to automatically establish communication permission between native applications and/or services and the verification engine (e.g., 202) and/or data source (e.g., database 204) or data sources.

Figure 3:
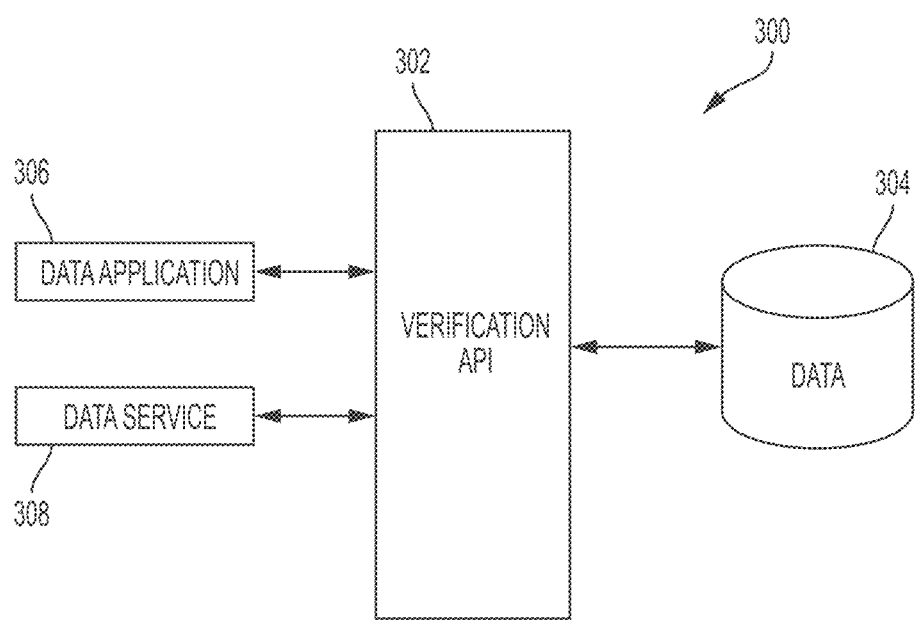
FIG. 3 is a block diagram of an example implementation of a data verification system, according to some embodiments.

FIG. 3 is a block diagram of a verification system architecture 300. In the example configuration, the verification system and/or functionality is integrated into existing systems (e.g., data application 306 and/or data service 308) as an application programming interface layer or application programming interface (e.g., 302). The API or API layer can manages execution of the functionality discussed herein for the verification system and/or verification system components. The example architectures (e.g., FIG. 2 and FIG. 3) provide illustrative examples for integration of the verification system. In other embodiments, the verification system itself can provide data access services and/or application (e.g., data room functionality, document review functionality, document production functionality, and more broadly data review or production functionality, etc. as a stand-alone system. In various implementations the verification system is integrated with or manages existing system that can have distributed component or be implemented in cloud or virtual resources. The verification system is configured to seamlessly manage data verification in these architectures and provide tailorable privacy boundaries for both system components and users to ensure confidential material remains in the control of the holder of the confidential material. Additionally, the system provides assurance to other parties that the confidential material (while not necessarily accessible) can be validated, for example, with public and/or private blockchains.

Example Implementation: Virtual Data Rooms

According to various aspects, an environment suited for embodiments of the verification system discussed herein includes data room augmentation and also virtual data room integration. One of the advances in managing and utilizing large scale documentation (e.g., in the context in large financial transactions) was the development of virtualized data rooms instead of paper based repositories. Various aspects and embodiments enhance virtualize data rooms, providing functionality unavailable in conventional implementation, and improving and accuracy and efficiency of such approaches. Although various embodiments of the verification system are also configured to augment/integrate with paper based approaches as well as virtualized systems.

With the implementation of online "virtual data room" ("VDR") (essentially a GUI front-end interfacing with a document database and display system, and sometimes a content management system or forum for interaction) the costs of the due diligence review were dramatically decreased while the system based efficiencies increased. The virtualization of data rooms also enabled new functionalities that would have been difficult or impossible to implement with a paper data room infrastructure.

Various examples of the improved functionality provided by virtual data rooms includes: a) full search—the ability to search for key words or phrases at the document level and return lists of potentially relevant documents for review was a dramatic efficiency gain in the transaction process; b) remote question and answer functionality-virtualization permits extensive interaction between reviewer (e.g., a bidder) and confidential information holder (e.g., a seller) during the diligence process, no matter where the bidder and seller happen to be situated; c) complex and hierarchical access control-fin grain control over user access to confidential data; d) external user tracing of VDR; e) internal user tracking; f) archiving data room and operations to storage; g) disclosure logging; and h) review auditing. Various embodiments of the verification system provide additional enhancement and additional functionality even over the improvements made in the transition to the virtual data room. For example verification (e.g., with distributed ledger integration and validation) provides enhanced functionality and assurance in each example: a) searching—each search can be tracked, captures in verifiable ledgers for subsequent proof even without revealing the underlying search or information (e.g., public based ledger): b) remote functionality—the verification system provides enables its functions both remotely and locally while at the same time preserving the information holders control over their information and how verification information is distributed; d & c) use tracking (internal and external)—embodiments of the verification system provide provable logging that can be shared even as the data room or VDR is being used (e.g., public ledger); f & g) archive and auditing-become verifiable in content, access, operations, all with the assurance that no tampering has occurred with either public ledgers, private ledger or hybrids significantly improving information assurance over conventional approaches through use of the verification functionality.

In this setting, the enhanced functionality offer new opportunities and new functionality to set new standards and options for VDR offerings. Ultimately conventional VDR approaches require participants to trust the institutions or entities providing the VDR service. Thus, it is realized that the ability of a VDR provider to credibly assert that a given document existed at a given time and was viewed by a given username-person mapping depends on such trust. Similarly, third parties must exists for an "end of transaction archive" to believe it is a true and accurate representation of the final state. Various aspects of the verification system eliminate trust requirements by establishing provable verification information that can be tracked over time, made publicly available, and under the control of the entity holding confidential information. For example, an entry into a public blockchain of a transaction or archive establishes provable information for certification, and particularly with respect to a "digital notary" certification (i.e. "this document appeared exactly this way at this date.")

According to further aspects, as an application where time-sensitive document presentation and review are critical to efficiency, seamless integration into VDR systems and with VDR providers offers improvements in information assurance and processing efficiency that cannot be found in conventional approaches. In some embodiments, the verification system enables virtual and/or digital notary functions that are provable even by outside or public parties.

An example implementation includes the verification system internally deployed on existing VDR infrastructure enabling close integration with the already deployed native functionality (e.g., GUI front-ends for third and fourth generation VDR providers), and enables digital ledger services as a complimentary function, that in some examples, can be accessed through the native UIs of the VDR providers. In some examples, the system provides overlay UI selections that enable verification functions (e.g., build snapshot into a distributed ledger, log user activity, define privacy boundary, etc.).

In further embodiments, hybrid distributed ledger are implemented. Hybrids ledgers include or rely on both public and private ledgers for efficiently establishing provable information. For example, the public Ethereum blockchain contains nearly 5 million blocks and occupies on the order of 65 gigabytes of space. The Bitcoin blockchain is much larger. In one example, hybrid ledgers are employed to avoid the complexity and size issues associated with known blockchain encodings. In additional using hybrid ledgers enables confidentiality assurance that cannot be provide by some conventional public blockchain implementations. In one embodiment, the verification system employs cryptographic hashes or digests to "freeze" or capture the state of a document, and encodes those hashes into a public blockchain that is digitally signed. The public blockchain provides a provable timestamp/integrity assertion (i.e., that the document existing in this way at this time). In addition, information contained in a private blockchain can also be verified, as the same hash can only be created on the same document. With cryptographic hash functions the likelihood of generating a malicious hash or has collision is so small as to be impractical.

Based on the architecture of the verification system, various embodiments can be readily incorporated in existing VDR platforms. However, other embodiment are configured to provide full VDR support and provide the verification functionality discussed herein. In further embodiments, the verification system is configured to enable verification functionality in other setting and/or to augment other native applications. For example, any settlement/clearance system can be enhanced wherein information assurance on arbitrary digital assets is desired (for example: mortgage bundles and associated documentation), providing the option and features to execute a provable storage solution (including, for example, related documentation) and/or digital notary services.

According to one embodiment, various levels of functionality can be provided with integration of the verification system. In one example, a first level of augmented functionality includes preservations and generation of provable data provenance for large, persistent document archives (e.g., digital notary integration). In some implementations, the system gracefully avoids the issue of trying to committing such archives to a public distributer ledger (e.g., a public blockchain) by generating, for example, hash values and incorporating the hash values into a hybrid solution that provides provable information and preservers confidentiality of the underlying information.

According to various embodiments, the verification system enables private integration into public blockchains. In one example, the system can be configured to build a private blockchain to securely store and notarize a document, a document archive, or a series of document bundles. Further the system can periodically, a-periodically, on a schedule, or based on events take cryptographic hashes of the existing private blockchain to enter those hashes in a public blockchain that established confidential but provable information for any verifier. Thus, the verification system leverage the advantages of both public and private distributed ledgers without the burden and computational inefficiency of build the entire archive into a distributed ledger. According to various examples, the system provides the end-user a certified, timestamped archive, and public assurance (e.g., provable information) that the archive existed in a given state at a given time. Additionally, confidentiality of the underlying documents and/or archive is maintained even if the provable information is made publicly available.

Figure 4:
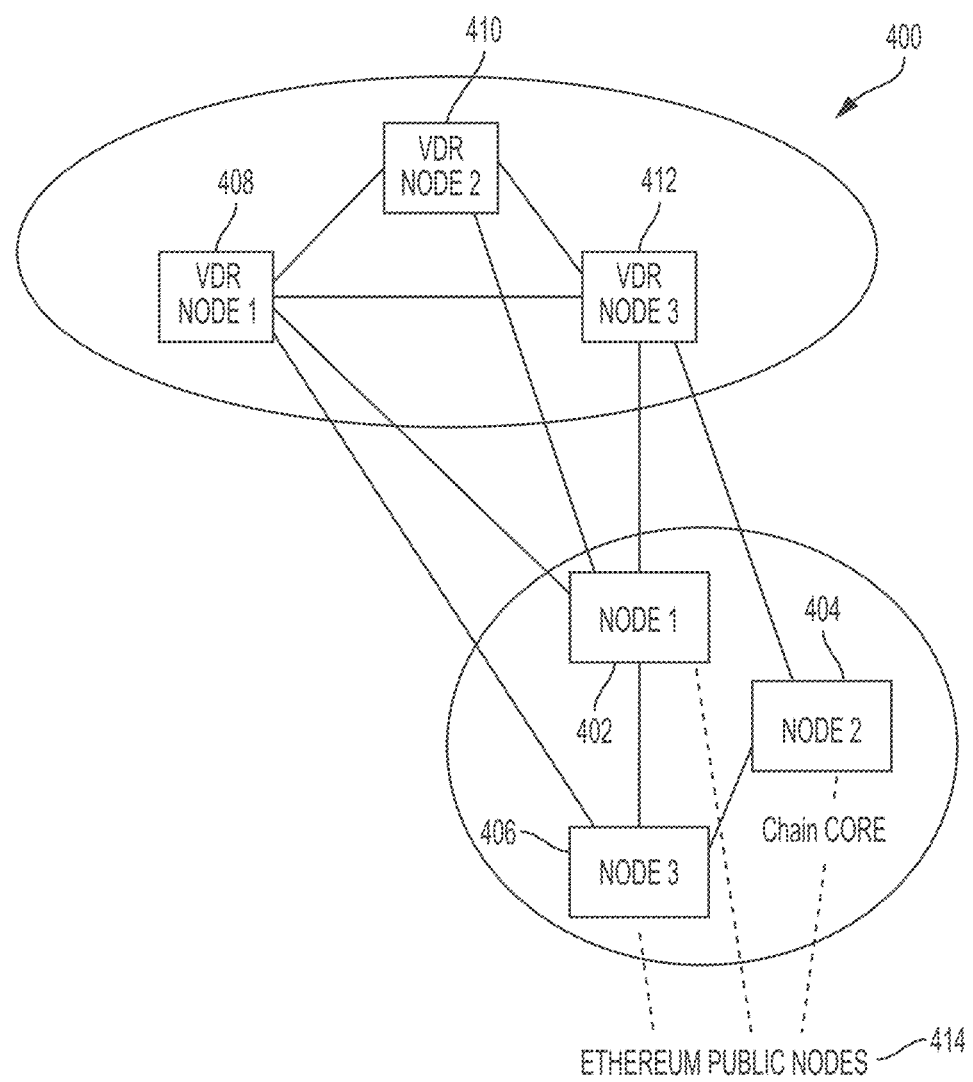
FIG. 4 is a block diagram of an example implementation of a data verification system, according to some embodiments.

FIG. 4 is a block diagram of a verification system and VDR service 400. FIG. 4 illustrates a three node core infrastructure (402, 404, 406), but other embodiments can include additional nodes, or fewer nodes. The core nodes are configured to provide for deployment of private chain functionality with or without peripheral nodes (e.g., 408, 410, 412) that can be served, housed, or installed, at a client location or can be instantiated on client controlled resources (e.g., client cloud resources). The nodes are configured to provide for private ledger generation (i.e., verification information generated on confidential information). Generation of private chain verification information allows input of confidential information (e.g., encrypted or otherwise) along with file metadata, and/or logging information to generate verification information (e.g., a private chain). According to some embodiments, the nodes and/or peripheral nodes are also configured to generate snapshots of the private chains, and use the snapshot of the private chains as an input to a verification function (e.g., a hash function), and build the output of the verification function into a public distributed ledger or chain (e.g., public Ethereum blockchain). In one example, the core nodes (e.g., 402, 404, and 406) maintain a connection to the Ethereum blockchain, although in other examples different public blockchains can be used.

In various architectures, each peripheral node can be installed on existing client hardware or can be built into existing client architecture. In further embodiments, the core nodes or peripheral nodes can be virtual machines that can integrate into any cloud based architecture or be called by existing client architecture (including, for example, client local hardware or client cloud resources or mixtures, etc.). In some embodiments, the core nodes are also configured with one or more connections to public distributed ledger and/or networks. According to one example, the connections to public ledger enable the private chain verification information to be incorporated into publicly available and verifiable ledgers.

In some examples, the verification system enables a VDR provider to capture block indexes, hashes, and metadata on their confidential information on their local hardware or on their peripheral nodes (e.g., 408, 410, 412) for inclusion in public ledger information. The system is configured to allow the end users to share full file databases (encrypted or not) with the nodes of the core network (e.g., 402, 404, 406), for example by establishing the core nodes as being within the privacy boundary, or, in another example, the core nodes can be established outside any privacy boundary to have strict enforcement of confidentiality of any information. The various setting enabled by the system allow the holder/manager of the confidential information to establish any rules to preserve their confidential information and, for example, only allows access to confidential data to the peripheral nodes and/or "on-site" resources (e.g., resources under their control). In such settings nodes within the privacy boundary can generate private chain information (e.g., hashes made on confidential information) that is incorporated into a private distributed ledger. In one example, an Ethereum client or application is used to generate private ledger blocks, and the private chain is captured (e.g., hashed) to preserver its state a various times. These state captures are then incorporated into a public ledger. The public ledger becomes the source of verification information for the private chain.

In various embodiment, system components can also include discovery functionality. For example, the verification system and/or nodes of the verification system can be provided as pre-configured systems that can be connected to local networks and/or the internet. In some examples, the system executed self-discovery operations to identify respective nodes of the verification system, and to establish secure communication channels. Discovery operations can include identifying existing network architecture, and identifying anomalies for security review. In further examples, self-discovery functions can include determining and generating secure communication pathway, generating safe communication lists, updating filters and/or firewalls to enable verification system components to communicate, etc.

Figure 5:
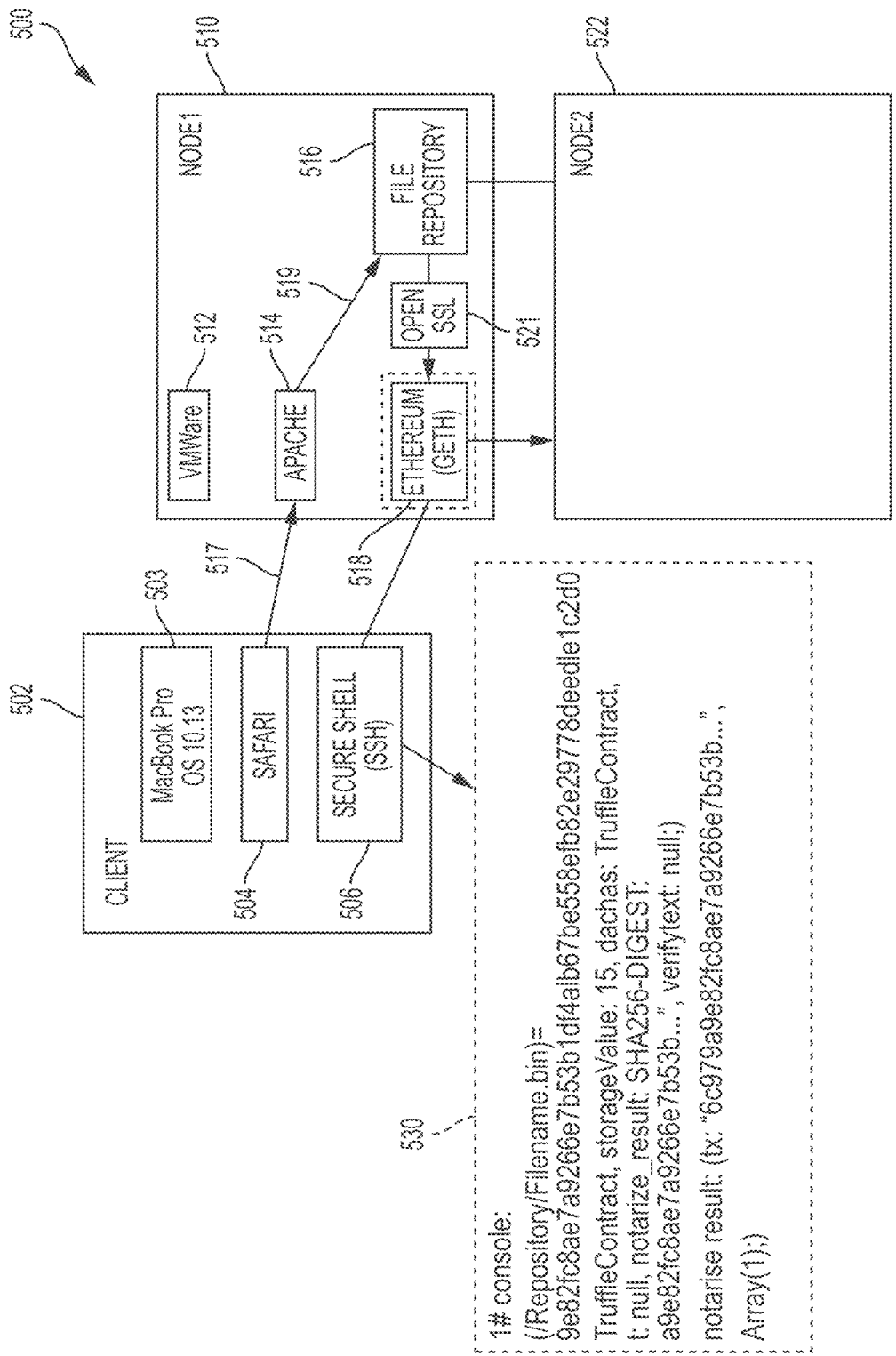
FIG. 5 is a block diagram of an example implementation of a data verification system and associated example data flows, according to some embodiments.

FIG. 5 illustrates a block diagram of elements of a verification system 500 and further shows committing confidential data to a private chain. In one embodiment, a client system 502 accesses a node (e.g., 510—host of confidential data) of the verification system 500. The node 510 can be stand-alone hardware, can be executing on cloud resource, and/or can be implemented as a virtual machine (e.g., vmware application 512) executing on local hardware or on cloud based resources. The node 510 can include a webserver (e.g., apache 514) configured to manage interaction with a browser (e.g., safari 504) executing on the client 502. The connection between any client (e.g., 502) and any node (e.g., 510) can be managed as a secure connection (e.g., via SSH 506). In one example, the client uses a browser program (e.g., 504 Safari) to establish a connect to the node 510. Once connected (and for example authenticated) the client can view files in a file repository on the node (e.g., 516) if the client account/user account provides sufficient privileges. In some examples, client systems can be limited to accessing public information (e.g., a public blockchain), which can be made available through the node 510. In other examples, the client (and for example, the user account) accessing the node establishes sufficient privileges to add files to the repository. For example, arrow 517 illustrates a file upload from the client 502 to the node 510 and the file repository 516 via the web server (514—Apache). Arrow 519 illustrates the transfer of data to the file repository as part of the data upload. In various embodiments, one or more files and/or file directories, hierarchies, etc. can be uploaded to the node.

In various embodiments, once files are uploaded, a user on the client system can trigger notarization functions or trigger generation of verification information for the uploaded files. In some examples, the client can display a user interface on the client system that enables the user to select specific files to process for verification information. In other embodiments, the system can be configured to automatically generate verification information on uploaded files. In one example, a client application (e.g., 518 Ethereum client) executes on the node and generates verification information for individual files, groups of files, directories, files systems, etc., via secure pathways (e.g., arrow 521 open secure socket layer (SSL)). In various embodiments, the verification system is distributed across multiple nodes (including, for example, 522) and each node in the verification system can include similar components and functionality as node 510. In various examples, the client applications configured to generate verification information can be in communication, and can also be configured to develop verification information across the verification system and/or nodes of the verification system. The verification system can also include distributed file repositories, and each can maintain separate portions of confidential information or maintain redundant copies within the verification system.

Shown at 530 is a console display providing example verification information for a file "filename.bin" stored in the file repository (e.g., /Repository/Filename.bin). According to various embodiments, the verification information includes a digest of the file, and enables subsequent verification that the viewed file appears in the same form (e.g., no changes or modification) as it did when the verification information was generated. Timestamps can also be generated as part of the verification information and/or can be include in the digest information for the file.

According to some embodiments, the verification system is also configured to automatically commit verification information on the system into a public blockchain. In one example, existing verification information (e.g., a private blockchain) is used as an input to a one way function (e.g., a hash or secure hash function, etc.) and the result incorporated into a public blockchain (e.g., as a block). The additional incorporation into a public chain provides another level of assurance that internal system information has not be doctored or developed in error, or even maliciously generated or altered—as any private chain information can be verified against existing public chain documentation.

Figure 6:
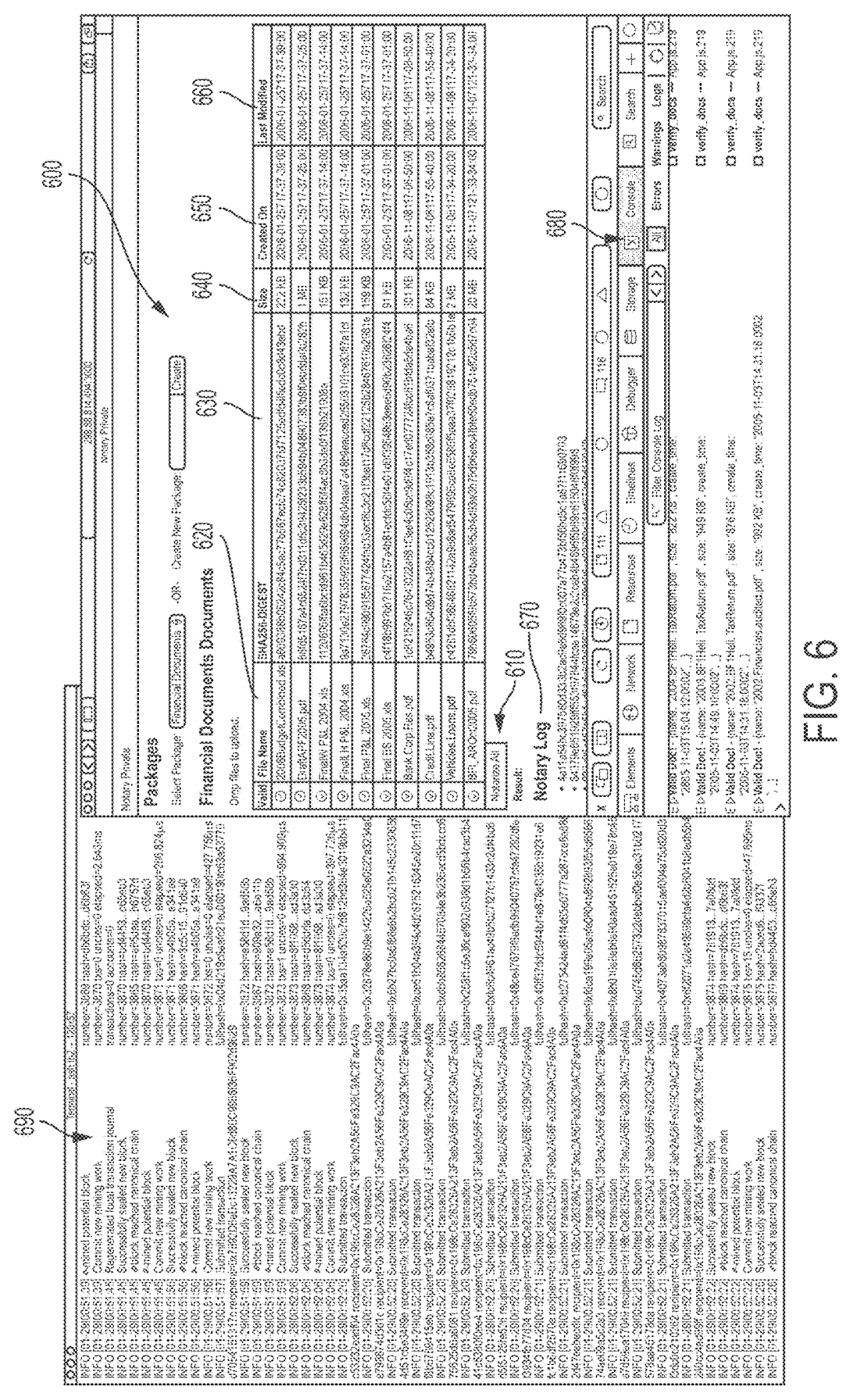

FIG. 6 illustrates an example user interface screen 600 showing a file listing for a file repository and/or directory within a file repository. The user interface provides a drag and drop window to add files to a repository. Further the user interface is configured to accept user specification of files to "notarize" or generate verification information. For example, a "Notarize All" function can be displayed at 610. Responsive to selection of 610 digest information for each file can be created and displayed (e.g., at 630) in conjunction with the file name (e.g., at 620) and any other metadata for the file (e.g., size at 640, created date at 650, and/or last modified date at 660). In various embodiments, any and all operations executed on the system can be logged and captures into verification information. In some examples, the user interface can visualize recent logging information as a notary log display (e.g., at 670). At 680, shown is an administrative console to illustrate validation functions that can be executed on the system. For example, once verification information is created for a file or files, the system can be configured to automatically verify the file matches existing verification information (e.g., newly generated hash values match existing hash values stored in a private, public or hybrid chain). In further example, window 690 illustrates operations being executed in the background by the verification system, which can include block mining operations to use with binding verification information into new blocks in private or public blockchains.

According to various embodiments, the user interface is specially configured to reduce or limit user selection error, and eliminate any learning curve for executing the verification functions. By eliminating user selection errors the user interface improves the functionality of the computer system on which it is implemented (and when compared to conventional approaches). Further the improved interface increase adoption and execution of the verification which yields improvements in data confidential and data assurance.

In one example, the UI is configured to visualize overlay displays (e.g., on top of or in conjunction with native user interfaces of an underlying architecture) of selectable generation icons for creating verification information that can be visualized in a user interface over existing displays to ensure a single selection is all that is necessary to build a document's verification information into a distributed ledger. Responsive to selection in the UI, the system can be configured to generate a one way hash of a selected document (s), file(s), file system, computer system, and/or file folder (s), etc., and build the output of the hash function into a distributed ledger for verification. Any changes to the underlying documents, files, file system, computer system, and/or folder will result in a failed verification against subsequent hashes.

As discussed above, various embodiments of the verification system can be configured to integrate and augment existing systems. For example, the verification system can be integrated with existing document review and/or data access/review systems. Document review system provide paper and virtual data rooms with associated functionality for collecting and enabling a reviewer to access and examine documentation, files, databases, etc. Other example platforms include mortgage documentation and tracking, loan generation systems, as well as arbitrary collateralization and securitization systems that bridge traditional paper records into digital representations to facilitate transactions or title transfers, among other options.

According to various aspects, the verification system facilitates integration with existing systems, and also can provide an extensible architecture for stand-alone implementation (including for example, document review functionality). In other embodiments, the verification system can include a plurality of APIs to manage communication with native systems and/or to enable native applications to call verification functions in a consistent manner. An example API specification follows to highlight various features that can be implemented as one or more APIs executing on the verification system (e.g., 100, 200, 300, etc.). In the example, functionality associated with a document management and review system is discussed, and the features of the API that serve the document management system are described with respect to an API call, command line prompt, required or optional parameters, description of the function and operation, and any system return from the call (for example success result and/or fail result).

Example API Specification

Authentication Examples

Various examples of the verification system implement a bimodal authentication scheme. In some embodiments, one mode is configured for use by a venue (e.g., confidential data host/owner/manager). According to some embodiments, the first mode is used to authenticate with administrator permissions, for example, via SSL client certificate authentication, or with an API_KEY/Secret pair. Further embodiments enable clients wishing to access their project data on the verification system, to do so under OAuth version 2 authentication. Other embodiments can implement different security approaches for managing users and/or permissioning users of the verification system and/or any integrated system or systems.

Example Project Management Operations:

Various embodiments include functions to add a new project and provision compute resources to run the blockchain functions discussed herein for the project, as well as manage ownership of data, documents, logging information, and/or confidential information on the system.

```
Example API Calls (Project Management Calls):
    POST /project/add/
    Description: Add a new project. Provision resources.
    Parameters:
        auth_token          API Authorization Token
        project_name        Venue Project Name / ID
    Returns:
        project_id          Unique Project ID
    POST /project/assign/
    Description: Assign / transfer ownership of a project.
    Parameters:
        auth_token          API Authorization Token
        project_id          Unique Project ID
        owner_id            OAuth2 ID for new project owner
    Returns:
        project_id          Unique Project ID
```

Example Functionality: Package Notarization

In various implementations, the functionality under execution resembles notarization operations, where an example functional is to provide a high degree of assurance (to any reviewing party or entity) that a particular document existed in a certain form and at a certain time in the past, and thereby prove/show that a currently visualized document is valid and unchanged. Various embodiments are configured to establish elements of this functionality based on generating assurance or verification information using a one way function (e.g., a hash function or secure hash function (e.g., SHA256-DIGEST hash)). The output of the one way function (e.g., using the document as input) can then be stored in a blockchain and used for subsequent verification.

In an example implementation, the digest (hash output) and incorporation into a blockchain can be viewed as sufficient if the system generating the digest output and the associated blockchain is fully trusted. However, various embodiments of the verification system enhance that security and level of information assurance, thereby eliminating the need for trust. Various embodiments use a framework for both verifying the validity of the contents of the document via the SHA256 hash, but add a further requirement of also verifying that the document was in a particular project at a particular location at a particular time.

Additionally, the verification system can be further configured to maintain the confidentiality of the underlying documents or files while developing the verification information that can be provided in both private and public forms. In various embodiments, it is assumed that it is undesirable, for both security and efficiency reasons, to send

```
Example API Calls:
    GET /auth/certificate/
    Description: Venue Certificate Authorization
    Parameters: None, SSL client certificate handshake handled by https.
    Returns: API Authorization Token (e.g., used in all further API calls for this session)
    POST /auth/key/
    Description: Venue API_KEY authorization
    Parameters:
        api_key     Assigned API_KEY
        secret      Assigned Secret
    Returns: API Authorization Token (auth_token) (e.g., used in further API calls for a
    session)
``` actual documents to an external system to generate verification information. Thus various embodiments enable the venue itself (e.g., data host/owner) to generate the output from a selected one way function (e.g., a SHA256 algorithm) and either send output values for incorporation into blockchain blocks or encode the output values into blockchain blocks directly.

Example API Calls:

POST/notary/add/

Description: Add new file/version, restore file version, new folder (implicit), copy file, copy folder. These venue based operations/events can be executed as special cases that can be handled with a single ADD call.

In some embodiments, the system implements the blockchain as an append only ledger, so even an event such as "restore file" on the venue components translates into an ADD call for the same path but with system storing the hash of the restored file version on the end of the ledger. Various embodiments also track or log activity on the system, and can also be configured to commit logging information to a blockchain for additional validation. In various examples, folder creation is implicit in the add file process, and will be created automatically by the system as necessary.

In another example, adding a file to a repository in the verification system generates an entry in the system log (e.g., notary log) specifying the action/operation executed and the parameters provided. In addition, a tree structure of filenames and hashes are generated, and can be used for fast verification purposes.

```
Parameters (POST /notary/add/):
    auth_token      API Authorization Token
    project_id      Unique Project ID
    file_path       File path with filename relative to package root
    hash            SHA256-DIGEST Hash of file
Returns:
result "SUCCESS" if call succeeds. Otherwise error message.
POST /notary/delete/
    Description:    Delete file, delete folder.
```

According to some embodiments, deleting a file in the verification system (e.g., triggering notary functions) is configured to create an entry in the notary log noting the action taken and the parameters provided (including, for example, user name, time, privileged, etc.) In various embodiments, the system maintain tree of hashes is then updated by removing the specified items. In some examples, the target parameter function is a pattern matching field that can refer to either a directory or a file or other digital store unit or group.

```
Examples:
    /financials/excel/sheet.xls     => delete the reference to the specific file sheet.xls
    /financials/excel/              => delete the reference to the /financials/excel/
    directory and recursively delete all files in all subdirectories that it contains
Parameters:
    auth_token              API Authorization Token
    project_id              Unique Project ID
    target File path pattern as described above
Returns:
    result                  "SUCCESS" if call succeeds. Otherwise error message.
    deleted                 List of items deleted. Empty if error.
POST /notary/move/
Description: Move file, Move folder, Rename file, rename folder.
```

According to various embodiments, moving a file in the file repository triggers the system to automatically create an entry in the notary log noting the action taken and the parameters provided. As above, the system maintained tree of hashes is automatically updated by deleting specified items and re-adding them with new file paths. Further embodiments, can be configured to log the origination location the new location, user performing the action, time, etc., and such information can be incorporated into a blockchain to provide validation of the logging information. In further examples, the logged data can be hashed and incorporated into a public chain or a private chain of logged information can be hashed to provide verification information.

According to various embodiments, the source and target parameters are pattern matching fields that can refer to either a directory or a file or other data storage unit. If the source refers to a specific file, the target must be either a specific file or specific folder. If the source refers to a directory then the target must also reference a directory. The system can be configured to validate target based in received source information.

```
Examples of the file path pattern:
    /financials/excel/sheet.xls     => reference to the specific file sheet.xls
    /financials/excel/              => reference to the /financials/excel/ directory and
    all files in all subdirectories that it contains
```

-continued

```
Parameters:
    auth_token              API Authorization Token
    project_id              Unique Project ID
    source                  File path pattern as described above
    target                  File path pattern as described above
Returns:
    result                  "SUCCESS" if call succeeds. Otherwise error message.
    moved                   List of items moved.   Empty if error.
POST /notary/log/
Description:                Return sequential log of all events that have occurred to target.
```

According to various embodiments, the target parameter is a pattern matching field that can refer to either a directory or a file.

```
Examples of the file path pattern:
    /financials/excel/sheet.xls     => reference to the specific file sheet.xls
    /financials/excel/              => reference to the /financials/excel/ directory and
    all files in all subdirectories that it contains
Parameters:
    auth_token              API Authorization Token
    project_id              Unique Project ID
    target                  File path pattern as described above
Returns:
    result                  "SUCCESS" if call succeeds. Otherwise error message.
    events                  List of log events.   Empty if error or no events.
POST /notary/verify/
Description:                Return all file path and hash pairs that match target.
```

Description: Return all file path and hash pairs that match target.

According to various embodiments, the system pass the returned path and hash pairs to the venue client/venue system, which is configured to match the generated file path and hashes to respective local file paths and hashes. In other embodiments, where the verification system includes full service functionality directly (e.g., includes document review functions and services or auditing review and services, etc.) the returned path and hashes can be used directly or can be disambiguated as they are generated. If all file paths and hashes match with no extraneous records, then the package is verified, and the system can present verification displays (e.g., green highlight, check mark, etc.) to provide a direct visual indicator of verified status. In some embodiments, the system generates overlay displays that are integrated within existing venue system user interfaces, and in others provides new UIs for display of the verification information/status.

According to various embodiments, any local change that the venue systems/users make to their files cause a "notarized" file package to fail further verification until further action is take (e.g., re-validate the changed file package). Additionally, the changes are reflected in system generated logs, which can be reviewed and verified like the hashes on the underlying data. In various aspects, the notary add/delete/move methods are the tools to be used for venue to "re-notarize" the package and thus bring the verification state back into sync, while logging events in the ledger. In various examples, the target parameter is a pattern matching field that can refer to either a directory or a file. Examples of the file path pattern:

```
    /financials/excel/sheet.xls     => reference to the specific file sheet.xls
    /financials/excel/              => reference to the /financials/excel/
    directory and all files in all subdirectories that it contains
Parameters:
    auth_token              API Authorization Token
    project_id              Unique Project ID
    target                  File path pattern as described above
Returns:
    result                  "SUCCESS" if call succeeds. Otherwise error message.
    hashes                  List of all file location and hash pairs that match target. Empty if
    error or no hashes that match target.
```

The above specification provides examples of API calls, functions, parameters, and return values. Similar functions can be implemented across different native applications and native processing platforms to provide verification functionality in different environments. Additionally, the API or APIs can provide enhanced user interface functionality, tying new visualizations on native user interfaces displays to various elements of the verification functionality discussed above. In other embodiments, additional user interface screens can be provided by the verification systems. And in yet others, user interface elements can be introduced seamlessly into native (e.g., venue) displays to enable, for example, one selection operation (e.g., mouse click, pointer selection, touch activation, etc.) of verification functions.

Example User Interface Screens

Figure 7:
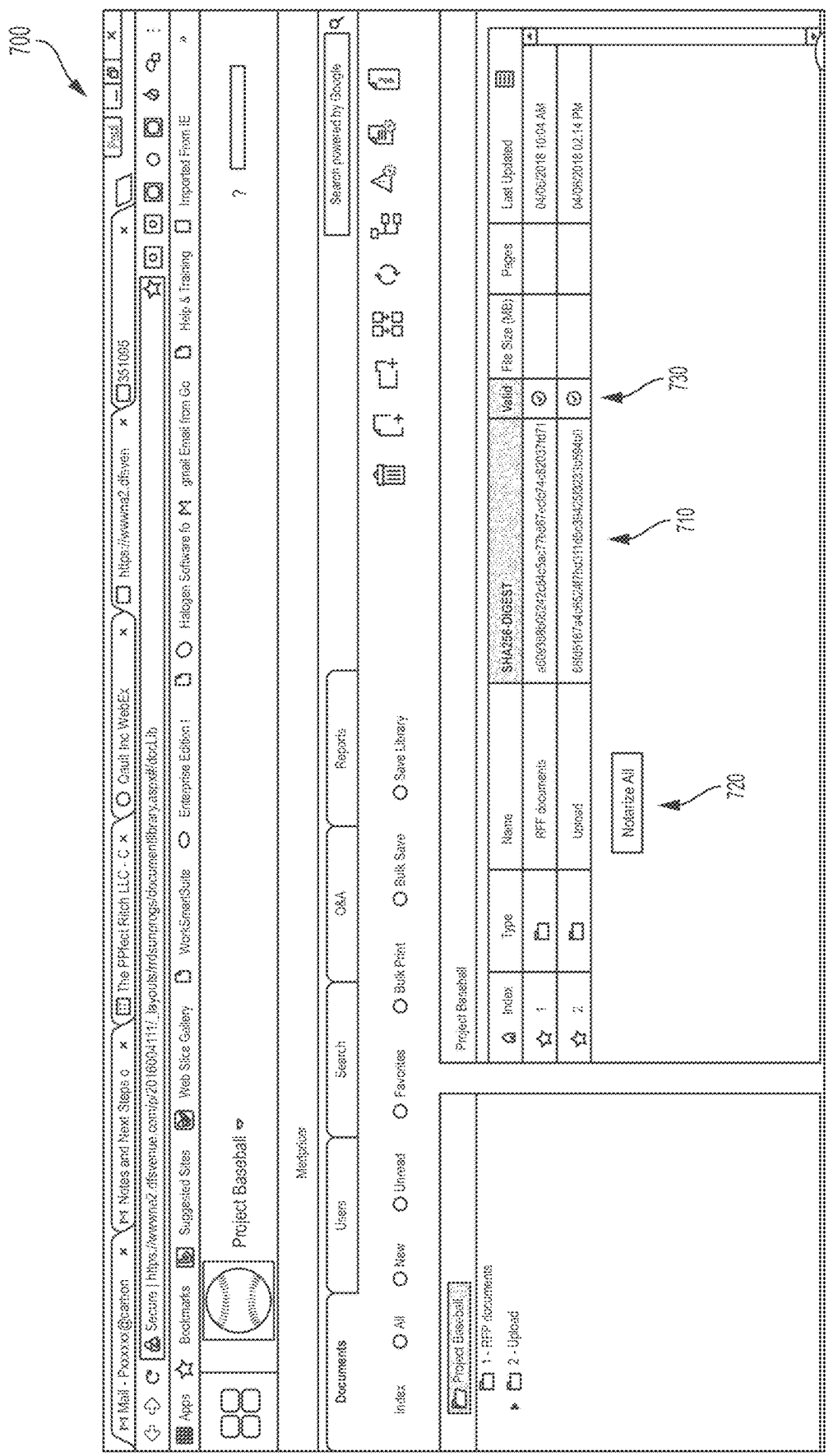
FIG. 7 is an example screen capture according to some embodiments.
Figure 8:
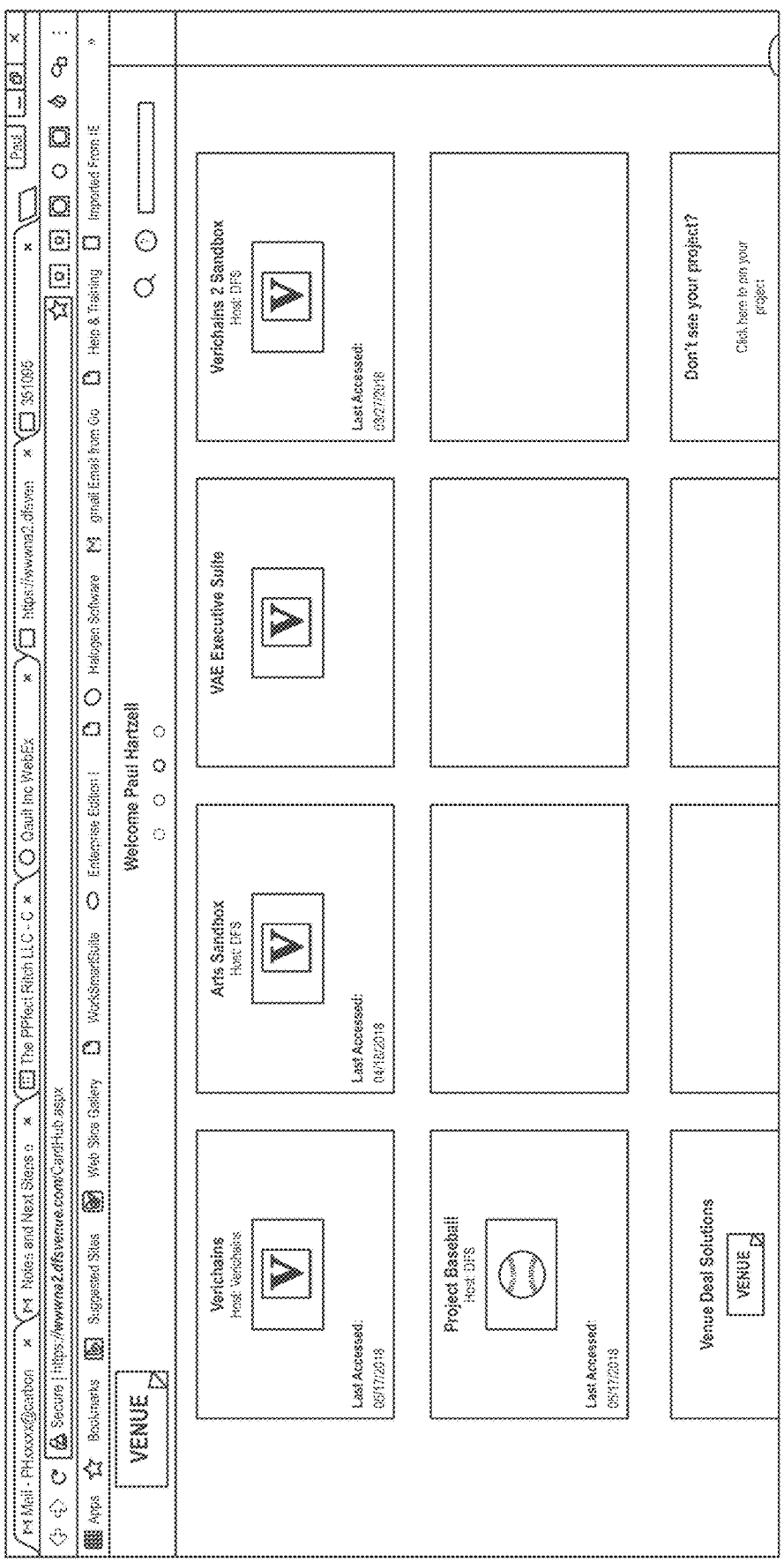
FIG. 8 is an example screen capture according to some embodiments.
Figure 9:
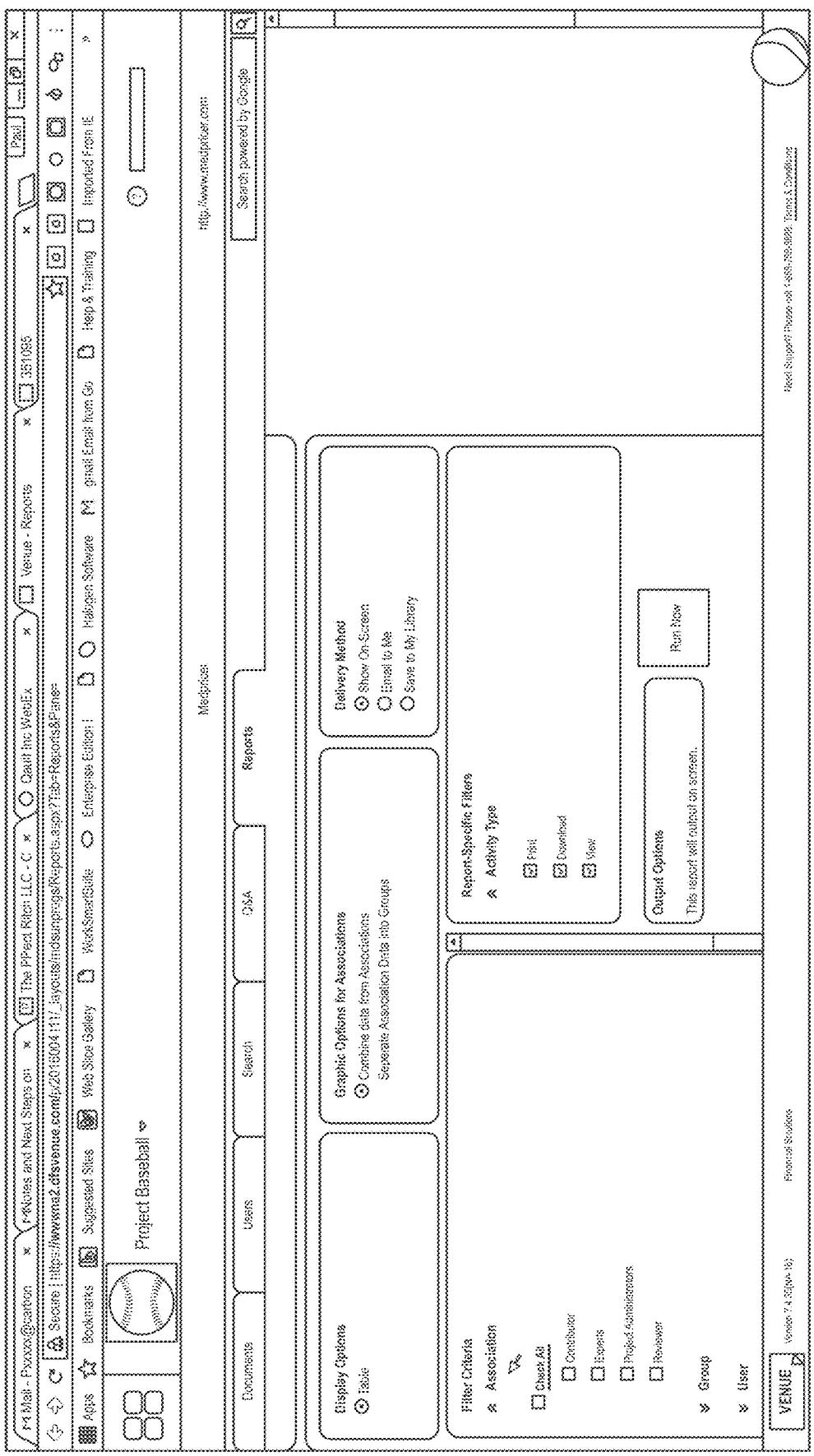
FIG. 9 is an example screen capture according to some embodiments.

According to various embodiments, the verification system can augment existing systems to provide the verification functions and operations discussed above. In some embodiments, the system can be tailored to existing document review and/or virtual data room system. FIGS. 7-9 illustrate example screen captures taken from a data review system augmented by verification functionality.

Shown in FIG. 7 is an example user interface 700 for executing document review functions, including navigating through document projects, uploading documents into a document project, searching, grant access privileges to users, etc. In addition to the review functionality provided, augmented services are shown in UI 700. For example, responsive to selection of "Notarize All," shown at 720, the files file hierarchy being displayed and all underlying documents, files, etc., can be processed to generate verification information establishing provable information for the file hierarchy's current state, and state of all document, files, etc. within the filer hierarchy. Once verification information has been generated by the system, the user interface can include display elements to visually provide that information to the end user. For example, at 710 a "SHA256-Digest column" is shown along with at least portions of the digest value obtained by processing the respective folders through a one way function. Where verification information exists for a given file or folder, the system is configured to automatically validate a current version of the file or folder. For example, the system automatically re-generates the verification information on the respective files and/or folders and compares the new result against the stored verification information. If any change has occurred on the file or folder, the new digest value will diverge and fail validation. Shown at 730 are visual indicators of valid verification information.

In addition to digest validation, the system can also be configured to automatically test, the currently generated validation information against public chain verification information. As discussed above, private blockchains are generated on confidential documents and the private chains can be accessed by any user having permission to view the confidential documents. Once verification information is committed to these private ledgers, various embodiments of the system capture digest information on the state of the private ledger, and commit that digest information to a publicly available blockchain. The publicly available chain becomes a source of additional verification information to verify that no malicious changes have been made to both the document as well as the private block chain and preventing a falsified match.

FIG. 8 illustrates a project navigator screen. The project navigator screen allows user to transition between project. In various embodiments, the system can be configured to log all access information to functions in the system and generate verification information for the respective logs. In other embodiments, logging can be limited to file based operations (e.g., view, access, move, update, modify, delete, validate, generate validation information, among other options).

FIG. 9 is an example screen capture of a reporting generation screen. Reporting operation can be logged by the system, including keyword associations, selection made in the UI, user name, time, etc. As part of logging access and/or operations on the system, verification information can be automatically generated. As discussed above, various embodiments generate both public and private ledgers for the verification information, that provide verifiable information on system usage as well as verification of stored data. The system can capture information needed to regenerate hashes and compare results to chain committed information.

Figure 10:
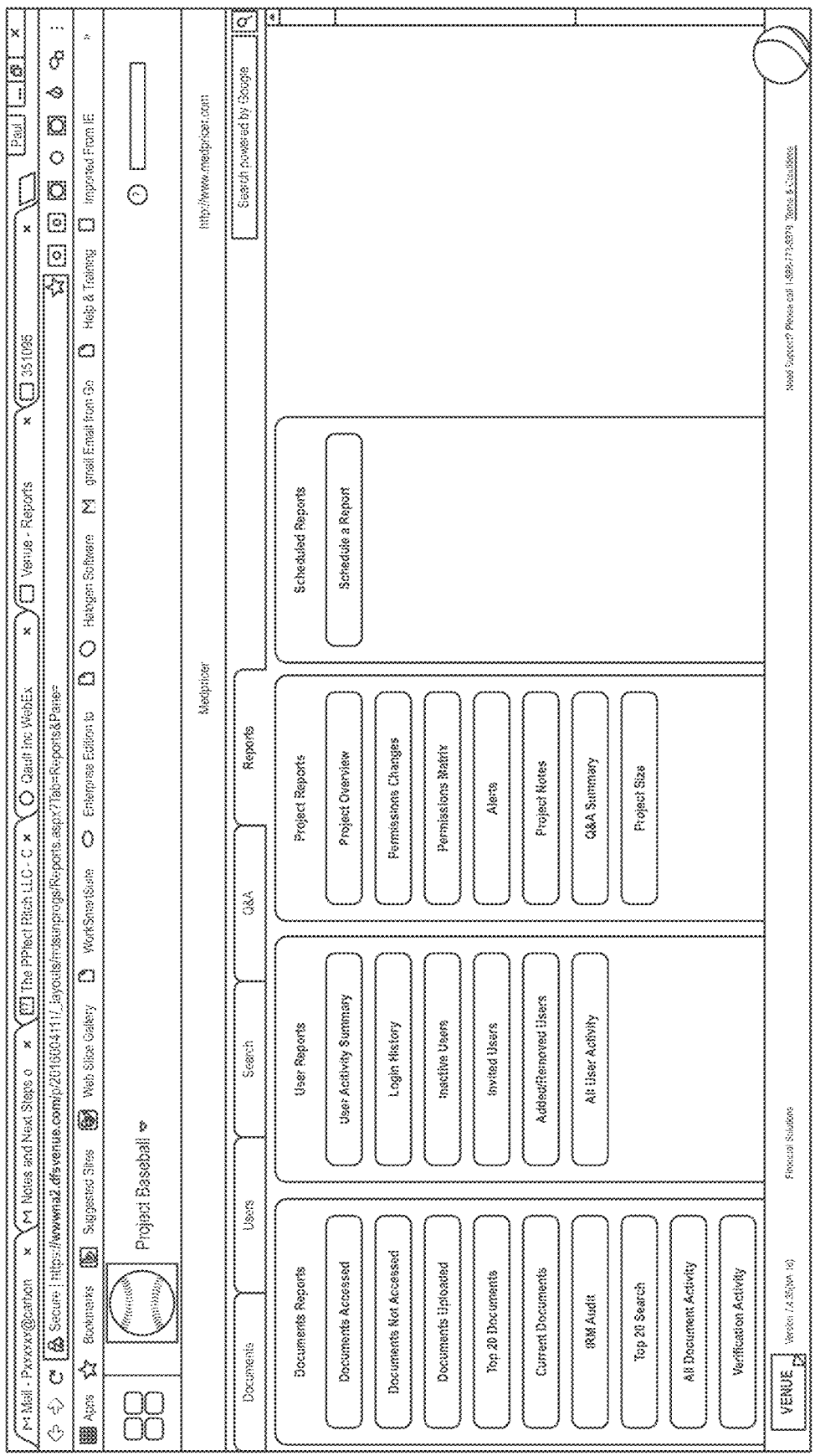
FIG. 10 is an example screen capture according to some embodiments.

FIG. 10 is an example screen capture of a report access screen. The system can generate standard report that can be used by end users. If various example, the system generated reports can facilitate administration, including, for example, defining user permissions, system privacy boundaries, viewing and managing verification information, generating verification information, auditing current filers, records, and/or system activity, among other options.

Figure 11:
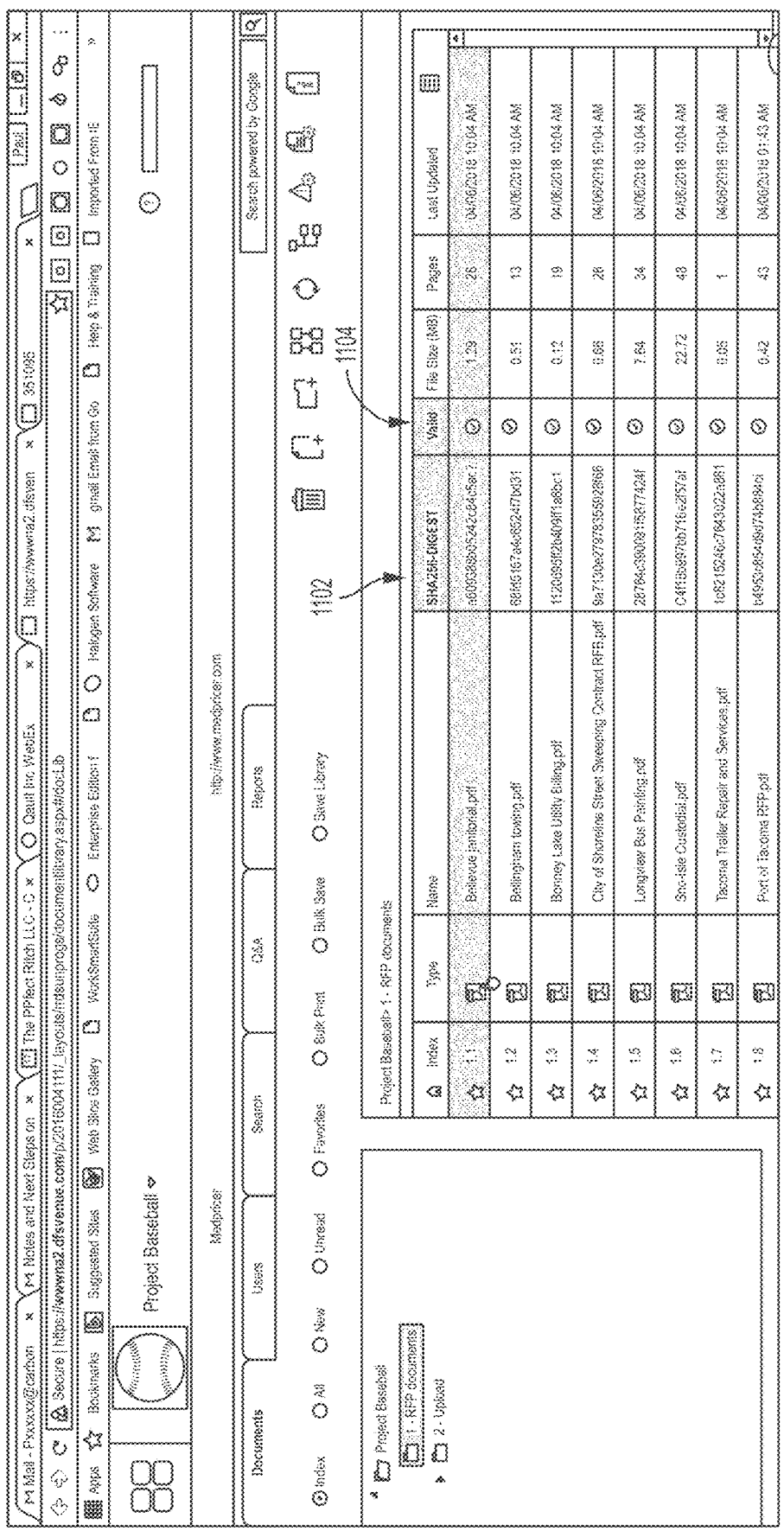
FIG. 11 is an example screen capture according to some embodiments.

FIG. 11 is an example screen capture 1100 of an interface for navigating files within a review project. According to one embodiment, at 1102 verification information is integrated into native displays. For example, a display element can provide and display digest information associated with a specific file. As discussed above, the verification system, API, and/or user interface elements can be configured to integrate directly into existing or native displays. In some examples, the system provides overlay displays that are display on top of existing user interfaces that can be selected by end users to access verification functions. In further examples, the system can be configured to identify areas to position overlay displays based on analysis of existing or native user interfaces. For example, the system can identify white space or unused space in a user interface display and determine a position and size for an overlay display based on available space, that is proximate or near file lists. In further examples, the system can automatically analyze existing display and identify file lists, folders, file hierarchies, etc., to further optimize positioning of overlay or integrated displays.

In one example, verification information generate by the system can include a validity check against existing verification information (e.g., confirm no changes has taken place since a last commitment of verification information to a blockchain). Responsive to determining the verification information is valid, the system can generate and display visual indications, for example, at 1104. In some examples, the visual indicator is display in association with the file or directory that been validated. An example visual element displayed in the user interface includes a green icon (e.g., green check mark), and various icons can be used as well as different colors. In further examples, a grey icon (e.g., question mark) can be used to show verification information does not yet exist for a file, document, directory, etc. The system can be configured to generate that missing verification information icon, such that responsive to selection, verification information is generated. In another example, a red icon (e.g., red "x") can be used to show a failed validation. In some implementations, a selection event triggers the system to display additional information on the failed validation (e.g., data and time of last valid check, prior verification information and time of generation, etc.). The selection events can include a mouse over, highlight, selection in the display, among other options.

FIG. 12 is an example screen capture showing a system generated report. According to various embodiments, the reporting interface can include information on behavior or user activity with respect to documents or data stored in a project. In some example, the user interface includes displays associated with system generated verification information. For example, at 1202 the system is configured to display a "logged digest" associated with documents and/or user behavior or operations executed on the system. As discussed herein, the system can be configured to track user activity and generate verification information for verifying the logged activity. In some examples, in addition to providing information assurance with respect to the stored documents and/or files, the system is also configured to provide verification functionality for operations executed on the system. Specifically, the system can generate both private ledgers on logged activity and respective public ledgers for validating the verification information. The logged digest display at 1202 is an example user interface elements for conveying the verification information on user activity, as well as a selectable link to details on the logged activity and respective verification information.

Figure 13:
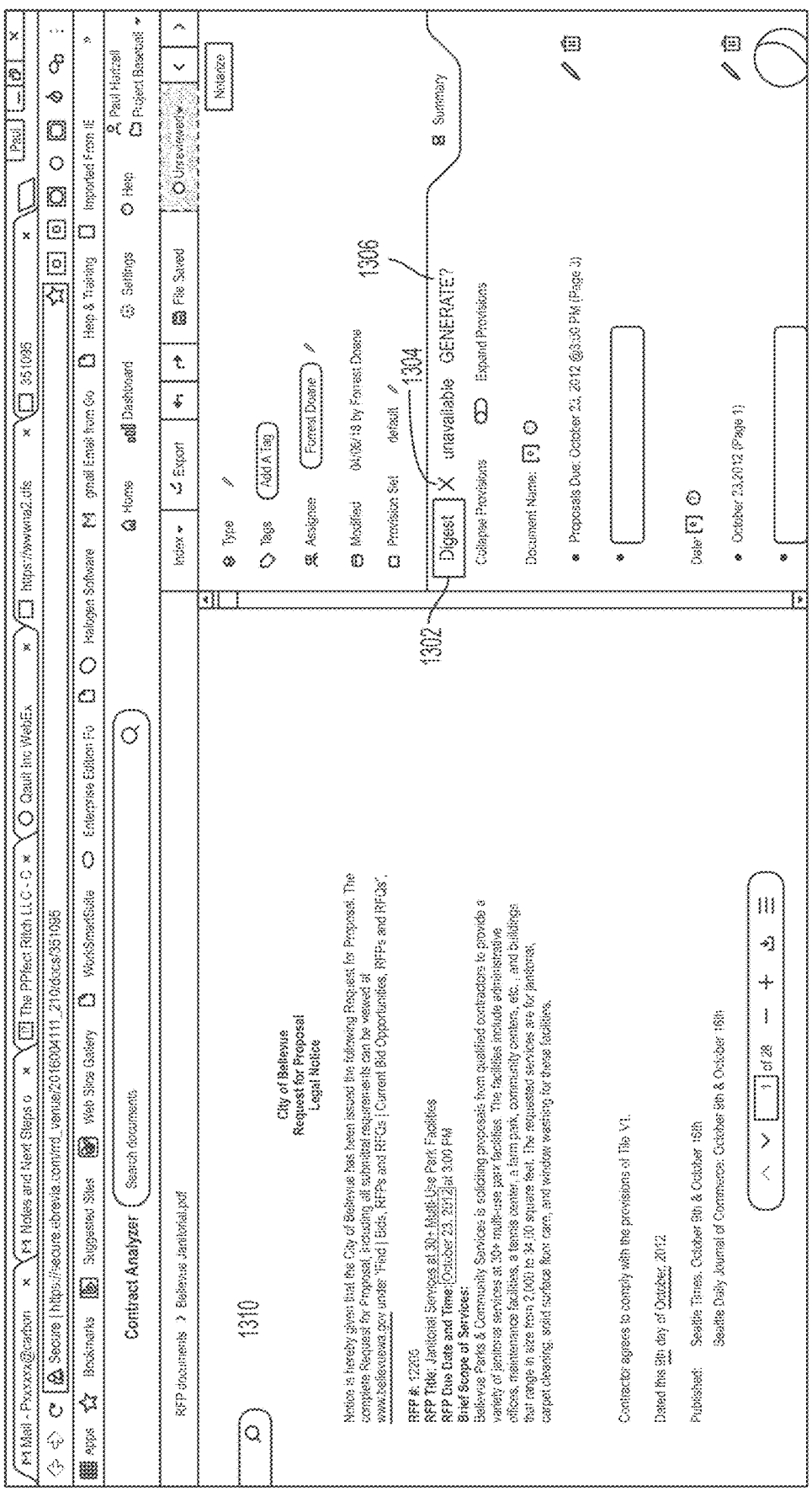
FIG. 13 is an example screen capture according to some embodiments.

FIG. 13 is an example screen capture showing integrated verification functions in a document review window. For example, at 1302 the user interface presents a selectable visualization. Responsive to selection of 1302, the system is configured to generate a digest for the reviewed document shown in the viewer portion of the window (e.g., 1310). If verification information does not exist the user interface displays an associated icon and/or text to convey the lack of verification information to the end user (e.g., at 1304). Responsive to determining verification information does not exist, the system can be configured to automatically generate verification information. In other embodiments, Responsive to determining verification information does not exist the system is configured to display an visual element configured to trigger generation of the verification information (e.g., 1306).

Figure 14:
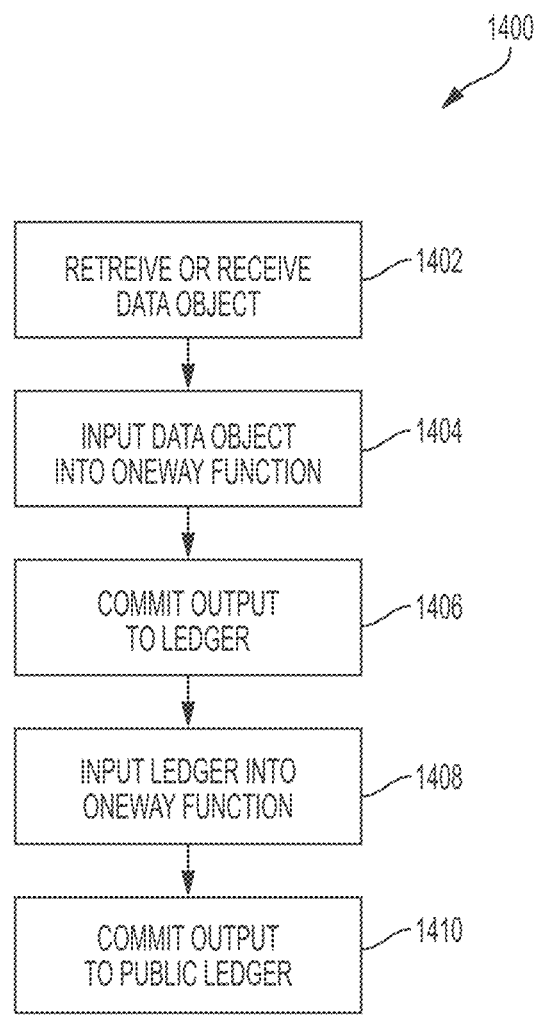
FIG. 14 is an example process flow for generating verification information, according to some embodiments.

FIG. 14 is an example process 1400 for generating verification information, for example, on a verification system. Process 1400 begins at 1402 with receiving or retrieving data objects. The data objects (e.g., any logical data storage unit) can be maintained in a file repository or any database and accessed or communicated via other processes at part of 1402. Once the data object is available, the data object is used as input for a one way function (e.g., SHA256 digest) at 1404. The output the one way function is a record of the state of the data object at the time the output was generated. In various embodiments, additional information can be included with the data object as input, including metadata (e.g., creation data and time, last update, author, tags, titles, date access, use name of access, etc.). The additional information can be generated as a separate output of the one way function or can be included with the data object.

Once the output from the one way function is generated, the output can be committed to a distributed ledger at 1406. In one example, the output of the one way function is built into a block of a distributed blockchain ledger. In some embodiments, a first ledger can be held privately by the host/owner/manager of the data objects input into the one way function. For example, the owner of the confidential information may wish to maintain complete control over which users can access the data objects and even the system elements that use data objects as input.

In various embodiments, process 1400 continues with generation of verification information for the distribute ledger created at 1408. In some examples, the system can capture information on the newly created block, or in other example the system can use the entire ledger as input into a one way function. The output can then be committed to a second distributed ledger at 1410, for example, as a new block in the second blockchain. According to various embodiments, the process 1400 can be executed to maintain confidentiality of the first distributed ledger. For example, the verification system executing process 1400 can limit access to the first block chain. While the first ledger is maintained confidentiality, the second block chain can be made publicly available. As the second ledger is public, the host/owner/manager of the confidential data can maliciously act on the public chain. In various embodiments, the hybrid of public and private chains increases data security and information assurance over conventional approaches.

Although process 1400 has been illustrated as a series of steps, other embodiments, can execute the steps in different order or execute respective ones of the steps together, merge steps, etc. In other embodiments, process 1400 can be combined or executed with other processes or various steps shown in 1400 can be used in other processes or can be called as sub-processes or sub-process steps.

Figure 15:
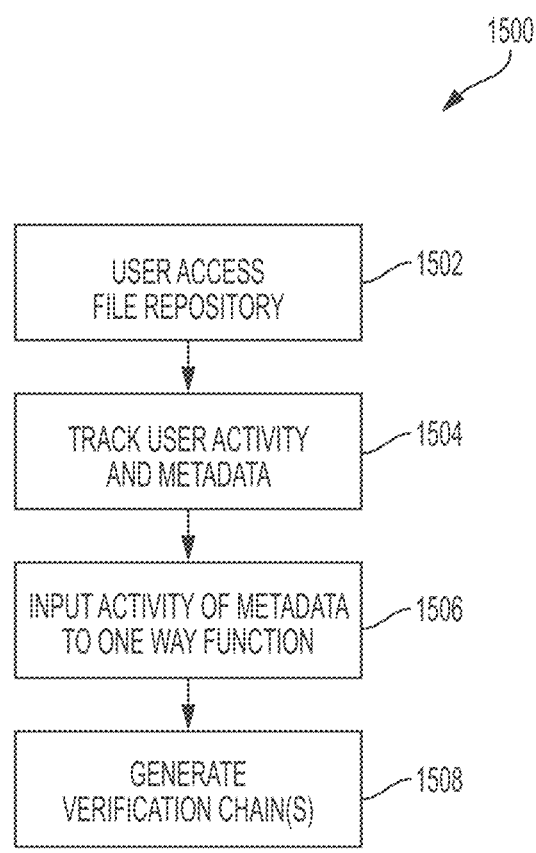
FIG. 15 is an example process flow for tracking and verifying user activity, according to some embodiments.

FIG. 15 is an example process 1500 for tracking and verifying user activity. According to one embodiment, process 1500 can be executed continuously on, for example, a verification system to track user activity. In other embodiments tracking can be event based or be triggered on other options (e.g., periodic, time, a-periodic, etc.). According to various embodiments, process 1500 beings at 1502 with a user triggering access to a file repository. The file repository can include stored confidential information or can be a container for information that will be stored. User activity taken is tracked along with optional metadata on the user and specific activity (e.g., date, time, IP address, location, session time, session duration, etc.) at 1504. The user activity and metadata can be input into a one way function (e.g., a portion or entirety of a user activity log can be input into the one way function) at 1506. The output of the one way function can be built into a first distributed ledger, and similar to steps 1404-1410 of FIG. 14, a second ledger can be generated on the activity information. In various settings, not only is an activity log available to verify activity on the system but verification information (e.g., first distributed ledger) can be made available to confirm the activity log, and further, the public verification information can be used to prove no changes have taken place on the first distributed ledger.

Although process 1500 has been illustrated as a series of steps, other embodiments, can execute the steps in different order or execute respective ones of the steps together, merge steps, etc. In other embodiments, process 1500 can be combined or executed with other processes or various steps shown in 1500 can be used in other processes or can be called as sub-processes or sub-process steps.

Figure 16:
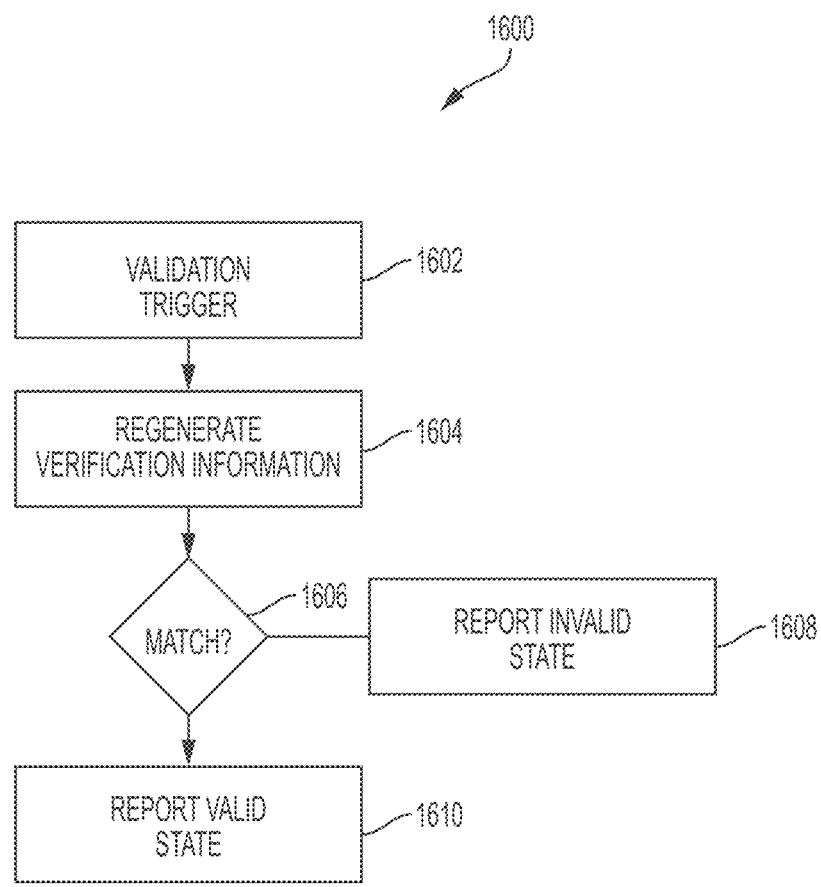
FIG. 16 is an example process flow for determining a validation state, according to some embodiments.

Shown in FIG. 16 is an example process flow 1600 for determining a validation state. Process 1600 can be executed, for example, by a verification system, engine, and/or components. In one embodiment, process 1600 being at 1602 with detection of a validation trigger. In some examples, the validation trigger can include a user access to data, user interface operations, new file generation, file modification, etc. In other examples, the validation trigger can be temporal (e.g., periodic, a-periodic, scheduled, etc.). Responsive to detecting a validation trigger, process 1600 continues at 1604 with re-generation of verification information.

According to one example, this can include inputting a document or other data object into a one way function to generation an output value (e.g., a digest) that can be compared to a value (e.g., a digest) stored in a block in a blockchain. The comparison can occur, for example, at 1606. If there is a match 1606 YES, the validation state is reported as valid at 1610. In further examples, the match operations is also configured to determine if the blockchain storing the value is itself valid. For example, the process can test if the regenerated digest is valid on a first blockchain and test if the first blockchain itself is valid against information stored in a second blockchain. In some embodiments, only if both checks passed is the status reported as valid (e.g., at 1610).

In various examples, the validation state can be linked to visual displayed in a user interface, and the validation state reporting at 1610 can include display a valid visual indication in a user interface. If there no match between the stored value in the first ledger, then process 1600 continues at 1608 with a report of an invalid state. In further embodiments, if the stored value does not match regenerated information on the document or data object or if the stored digest based on the first ledger does not match a regenerated digest on the first ledger, then an invalid state is reported at 1608.

Although process 1600 has been illustrated as a series of steps, other embodiments, can execute the steps in different order or execute respective ones of the steps together, merge steps, etc. In other embodiments, process 1600 can be combined or executed with other processes or various steps shown in 1600 can be used in other processes or can be called as sub-processes or sub-process steps.

Figure 17:
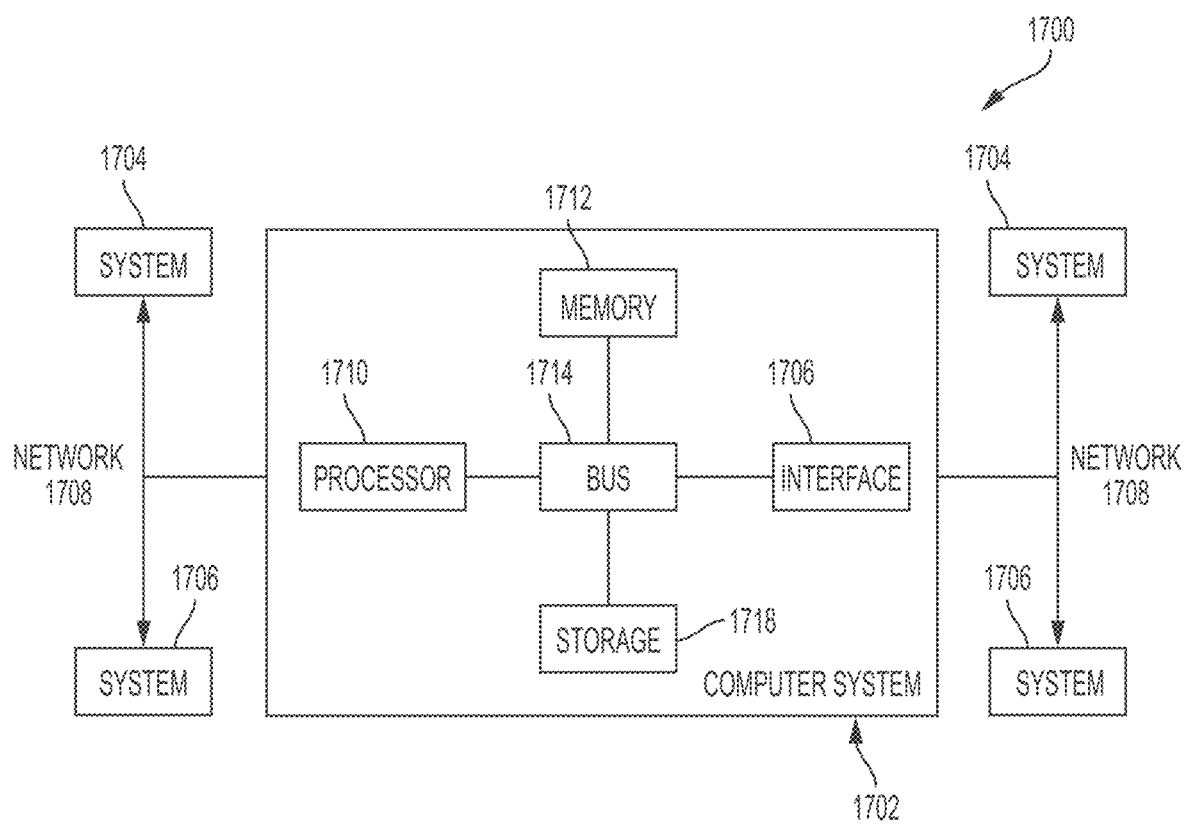
FIG. 17 is a block diagram of a computing platform which can be augmented by the functions discussed herein.

FIG. 17 is block diagram of a computer system on which the enhanced functionality discussed herein augments the computer to enable at least one of the following (in various examples): execution of new functionality, improvement in the security of confidential data stored on the system, to improvement in the verifiability of the data on the system, enable validation of the verification information, and provide various other improvements over conventional approaches and computer systems.

Various aspects and functions described herein, in accord with aspects of the present invention, may be implemented as hardware, software executing on hardware, or a combination of hardware and software executing on one or more computer systems. Aspects in accord with the present invention may be located on a single computer system or may be distributed among one or more computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software executing on hardware, hardware or firmware, or any combination thereof. Thus, aspects in accord with the present invention may be implemented within methods, acts, systems, system placements and components using a variety of hardware and software configurations, and the implementation is not limited to any particular distributed architecture, network, or communication protocol. Furthermore, aspects in accord with the present invention may be implemented as specially-programmed hardware and/or software executing on hardware or on cloud resources (ultimately executing on some hardware).

FIG. 17 shows a block diagram of a distributed computer system 1700, in which various aspects and functions in accord with the present invention may be practiced. The distributed computer system 1700 may include one more computer systems. For example, as illustrated, the distributed computer system 1700 includes three computer systems 1702, 1704 and 1706. As shown, the computer systems 1702, 1704 and 1706 are interconnected by, and may exchange data through, a communication network 1708. The network 1708 may include any communication network through which computer systems may exchange data. To exchange data via the network 1708, the computer systems 1702, 1704, and 1706 and the network 1708 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA IIOP, RMI, DCOM and Web Services.

Computer systems 1702, 1704 and 1706 may include mobile devices such as cellular telephones. The communication network may further employ one or more mobile access technologies including 2nd (2G), 3rd (3G), 4th (4G or LTE) generation radio access for cellular systems, WLAN, Wireless Router (WR) mesh, and other communication technologies. Access technologies such as 2G, 3G, 4G and LTE and future access networks may enable wide area coverage for mobile devices. For example, the network may enable a radio connection through a radio network access such as Global System for Mobil communication (GSM), General Packet Radio Services (GPRS), Enhanced Data GSM Environment (EDGE), Wideband Code Division Multiple Access (WCDMA), among other communication standards. Network may include any wireless communication mechanism by which information may travel between the devices 1704 and other computing devices in the network.

In various embodiments, to ensure data transfer is secure, the computer systems 1702, 1704 and 1706 may transmit data via the network 1708 using a variety of security measures including TSL, SSL or VPN, among other security techniques. While the distributed computer system 1700 illustrates three networked computer systems, the distributed computer system 1700 may include any number of computer systems, networked using any medium and communication protocol.

Various aspects and functions may be implemented as specialized hardware or software executing in one or more computer systems including the computer system 1702 shown in FIG. 17. As depicted, the computer system 1702 includes a processor 1710, a memory 1712, a bus 1714, an interface 1716 and a storage system 1718. The processor 1710, which may include one or more microprocessors or other types of controllers, can perform a series of instructions that manipulate data. The processor 1710 may be a well-known, commercially available processor such as an Intel Pentium, Intel Atom, ARM Processor, Motorola PowerPC, SGI MIPS, Sun UltraSPARC, or Hewlett-Packard PA-RISC processor, or may be any other type of processor or controller as many other processors and controllers are available. As shown, the processor 1710 is connected to other system placements, including a memory 1712, by the bus 1714.

The memory 1712 may be used for storing programs and data during operation of the computer system 1702. Thus, the memory 1712 may be a relatively high performance, volatile, random access memory such as a dynamic random access memory (DRAM) or static memory (SRAM). However, the memory 1712 may include any device for storing data, such as a disk drive or other non-volatile storage device, such as flash memory or phase-change memory (PCM). Various embodiments in accord with the present invention can organize the memory 1712 into particularized and, in some cases, unique structures to perform the aspects and functions disclosed herein.

Components of the computer system 1702 may be coupled by an interconnection element such as the bus 1714. The bus 1714 may include one or more physical busses (for example, busses between components that are integrated within a same machine), and may include any communication coupling between system placements including specialized or standard computing bus technologies such as IDE, SCSI, PCI and InfiniBand. Thus, the bus 1714 enables communications (for example, data and instructions) to be exchanged between system components of the computer system 1702.

Computer system 1702 also includes one or more interfaces 1716 such as input devices, output devices and combination input/output devices. The interface devices 1716 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 1716 allow the computer system 1702 to exchange information and communicate with external entities, such as users and other systems.

Storage system 1718 may include a computer-readable and computer-writeable nonvolatile storage medium in which instructions are stored that define a program to be executed by the processor. The storage system 1718 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 1710 or some other controller may cause data to be read from the nonvolatile recording medium into another memory, such as the memory 1712, that allows for faster access to the information by the processor 1710 than does the storage medium included in the storage system 1718. The memory may be located in the storage system 1718 or in the memory 1712. The processor 1710 may manipulate the data within the memory 1712, and then copy the data to the medium associated with the storage system 1718 after processing is completed. A variety of components may manage data movement between the medium and the memory 1712, and the invention is not limited thereto.

Further, the invention is not limited to a particular memory system or storage system. Although the computer system 1702 is shown by way of example as one type of computer system upon which various aspects and functions in accord with the present invention may be practiced, aspects of the invention are not limited to being implemented on the computer system. Various aspects and functions in accord with the present invention may be practiced on one or more computers having different architectures or components than that shown in FIG. 17. For instance, the computer system 1702 may include specially-programmed, special-purpose hardware, such as for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

The computer system 1702 may include an operating system that manages at least a portion of the hardware placements included in computer system 1702. A processor or controller, such as processor 717, may execute an operating system which may be, among others, a Windows-based operating system (for example, Windows NT, Windows 2000/ME, Windows XP, Windows 7, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

In various embodiments, the processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, functions in accord with aspects of the present invention may be implemented using an object-oriented programming language, such as JAVA, C++, or C# (C-Sharp), among others. Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or"

may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed:

The invention claimed is:

1. A system for securing data integrity, the system comprising:
   at least one processor operatively connected to a memory, the at least one processor configured to execute a plurality of system components;
   a verification engine, executed by the at least one processor, configured to:
      generate an output verification value based on executing a one way function on input data stored in a file repository;
      generate at least a first private verification chain incorporating a private verification value, the private verification value based, at least in part, on executing a first one way function on data stored in a file repository, wherein the first private verification chain is a limited access distributed ledger for permissioned users;
      generate at least a second public verification chain incorporating a public verification value, the public verification value based, at least in part, on executing a second one way function on the first verification chain as input; and
   a privacy component, executed by the at least one processor, configured to:
      manage access to the file repository or subsets of data stored in the file repository, and manage access permission to the private verification chain;
      define a privacy boundary to control access to the file repository or the subsets of data stored in the file repository and define access permissions to the private verification chain and verification value generation functions of the private verification chain;
      assign elements of a local computer architecture hosting the data within the file repository for participation in the private verification chain and define, at least in part, verification information available on a first public verification chain; and
      assign confidential information from the data within the file repository to incorporate into the private verification chain.

2. The system of claim 1, further comprising a document subsystem, executed by the at least one processor, configured to enable at least one or more of electronic document review, document auditing, or search operations within a file repository.

3. The system of claim 2, wherein the document subsystem enables a virtual data room for securely reviewing or searching data within the file repository.

4. The system of claim 1, further comprising at least a first application programming interface (API), executed by the at least one processor, configured to manage access requests to the file repository by the document subsystem and the verification engine.

5. The system of claim 4, wherein the at least the first API is configured to manage user requests received from a user interface to manually generate verification information on data in the file repository.

6. The system of claim 5, further comprising a ledger component, executed by the at least one processor, configured to automatically generate an update to the second verification chain responsive to executing the user request to generate verification information.

7. The system of claim 4, further comprising a privacy component, executed by the at least one processor, configured to manage access to the file repository or subsets of the file repository, the virtual data room, and access permission to the private verification chain.

8. The system of claim 1, further comprising an event monitor component, executed by the at least one processor, configured to log user or system operations.

9. The system of claim 8, further comprising a ledger component configured to incorporate logged operations into the first private verification chain and automatically update the first public verification chain with one or more new commitment blocks for verifying additions to the private chain.

10. The system of claim 1, wherein the first one way function and the second one way function are the same one way function.

11. A computer implemented method for securing data integrity, the method comprising:
   generating, by at least one processor, an output verification value based on executing a one way function on input data stored in a file repository;
   generating, by at least one processor, at least a first private verification chain incorporating a private verification value, the private verification value based, at least in part, on executing a first one way function on data stored in a file repository, wherein the first private verification chain is a limited access distributed ledger for permissioned users;
   generating, by the at least one processor, at least a second public verification chain incorporating a public verification value, the public verification value based, at least in part, on executing a second one way function on the first verification chain as input;
   managing, by the at least one processor, access to the file repository or subsets of data stored in the file repository, and manage access permission to the private verification chain;
   defining, by the at least one processor, a privacy boundary to control access to the file repository or the subsets of data stored in the file repository and defining access permissions to the private verification chain and verification value generation functions of the private verification chain;
   assigning, by the at least one processor, elements of a local computer architecture hosting the data within the file repository for participation in the private verification chain and defining, at least in part, verification information available on a first public verification chain; and
   assigning, by the at least one processor, confidential information from the data within the file repository to incorporate into the private verification chain.

12. The method of claim 11, further comprising enabling, by the at least one processor, at least one or more of electronic document review, document auditing, or search operations within a file repository.

13. The method of claim 12, further comprising hosting a virtual data room for securely reviewing or searching data within the file repository.

14. The method of claim 11, further comprising executing, by the at least one processor, at least a first application programming interface (API) configured to manage access requests to the file repository by the document subsystem and the verification engine.

15. The method of claim 14, further comprising managing with the at least the first API user requests received from a user interface to manually generate verification information on data in the file repository.

16. The method of claim 15, further comprising generating, automatically, an update to the second verification chain responsive to executing the user request to generate verification information.

17. The method of claim 14, further comprising managing access to the file repository or subsets of the file repository, the virtual data room, and access permission to the private verification chain.

18. The method of claim 11, further comprising logging user or system operations and incorporating logged information in the first private or the second public verification chain.

19. The method of claim 18, further comprising instantiating a ledger component configured to incorporate logged operations into the first private verification chain and automatically update the first public verification chain with one or more new commitment blocks for verifying additions to the private chain.

20. A non-transitory computer readable medium containing instructions that when executed cause at least one processor to perform a method for securing data integrity, the method comprising:
- generating an output verification value based on executing a one way function on input data stored in a file repository;
- generating at least a first private verification chain incorporating a private verification value, the private verification value based, at least in part, on executing a first one way function on data stored in a file repository, wherein the first private verification chain is a limited access distributed ledger for permissioned users;
- generating at least a second public verification chain incorporating a public verification value, the public verification value based, at least in part, on executing a second one way function on the first verification chain as input;
- managing access to the file repository or subsets of data stored in the file repository, and manage access permission to the private verification chain;
- defining a privacy boundary to control access to the file repository or the subsets of data stored in the file repository and defining access permissions to the private verification chain and verification value generation functions of the private verification chain;
- assigning elements of a local computer architecture hosting the data within the file repository for participation in the private verification chain and defining, at least in part, verification information available on a first public verification chain; and
- assigning confidential information from the data within the file repository to incorporate into the private verification chain.

\* \* \* \* \*